United States Patent
Sun et al.

(10) Patent No.: US 10,091,117 B2
(45) Date of Patent: Oct. 2, 2018

(54) CODE BLOCK SEGMENTATION AND RATE MATCHING FOR MULTIPLE TRANSPORT BLOCK TRANSMISSIONS

(71) Applicant: QUALCOMM Incorporated, San Diego, CA (US)

(72) Inventors: Jing Sun, San Diego, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 15/182,214

(22) Filed: Jun. 14, 2016

(65) Prior Publication Data
US 2017/0026297 A1  Jan. 26, 2017

Related U.S. Application Data

(60) Provisional application No. 62/196,757, filed on Jul. 24, 2015.

(51) Int. Cl.
*H04L 12/825* (2013.01)
*H04W 72/04* (2009.01)
(Continued)

(52) U.S. Cl.
CPC .......... *H04L 47/25* (2013.01); *H04B 7/0623* (2013.01); *H04L 1/0067* (2013.01); *H04L 1/1896* (2013.01); *H04L 1/0057* (2013.01)

(58) Field of Classification Search
None
See application file for complete search history.

(56) References Cited

U.S. PATENT DOCUMENTS

2005/0213536 A1   9/2005 Virtanen et al.
2006/0143444 A1*  6/2006 Malkamaki ........... H04L 1/0083
                                        713/160
(Continued)

FOREIGN PATENT DOCUMENTS

EP       1549003 A2    6/2005
WO  WO-2010069379 A2  6/2010
(Continued)

OTHER PUBLICATIONS

ISA/EP, International Search Report and Written Opinion of the International Searching Authority, Int'l Application No. PCT/US2016/037579, dated Nov. 29, 2016, European Patent Office, Rijswijk, NL, 22 pgs.

(Continued)

*Primary Examiner* — George C Atkins
(74) *Attorney, Agent, or Firm* — Holland & Hart LLP

(57) ABSTRACT

Techniques for code block (CB) segmentation and rate matching in wireless deployments that may use CB-level feedback may provide that a transport block group (TBG) may include one or more CBs from multiple transport blocks (TBs). Such TBGs may support retransmissions of one or more CBs from different TBs within a TBG transmission. In certain examples, a TBG size may be determined, and a retransmission size associated with any CBs to be retransmitted are determined. Based at least in part on the TBG size and retransmission size, it may be determined whether a new TB may be included in the TBG.

26 Claims, 22 Drawing Sheets

(51) Int. Cl.
*H04W 74/08* (2009.01)
*H04B 7/06* (2006.01)
*H04W 74/00* (2009.01)
*H04L 1/00* (2006.01)
*H04L 1/18* (2006.01)

(56) References Cited

U.S. PATENT DOCUMENTS

| | | | |
|---|---|---|---|
| 2007/0211822 A1* | 9/2007 | Olesen | H04B 7/0669 375/299 |
| 2007/0223614 A1* | 9/2007 | Kuchibhotla | H04L 1/1887 375/267 |
| 2007/0253388 A1 | 11/2007 | Pietraski | |
| 2008/0056229 A1* | 3/2008 | Gholmieh | H04W 72/042 370/349 |
| 2011/0274059 A1* | 11/2011 | Brown | H04L 27/0008 370/329 |
| 2012/0005550 A1* | 1/2012 | Ito | H04L 1/0003 714/748 |
| 2012/0311397 A1* | 12/2012 | Kim | H04L 1/0065 714/752 |
| 2013/0039348 A1* | 2/2013 | Hu | H04B 7/0613 370/335 |
| 2013/0051383 A1* | 2/2013 | Hakola | H04B 1/713 370/350 |
| 2013/0250924 A1* | 9/2013 | Chen | H04L 1/1819 370/336 |
| 2015/0098420 A1* | 4/2015 | Luo | H04L 1/0025 370/329 |
| 2015/0180615 A1* | 6/2015 | Yang | H04L 1/1822 370/328 |
| 2016/0119928 A1* | 4/2016 | Wu | H04L 5/001 370/329 |
| 2017/0195082 A1* | 7/2017 | Roh | H04L 1/0041 |
| 2017/0280448 A1* | 9/2017 | Takeda | H04W 72/0446 |

FOREIGN PATENT DOCUMENTS

WO WO-2011053970 A2 5/2011
WO WO-2013112703 A2 8/2013

OTHER PUBLICATIONS

ISA/EPO, Partial International Search Report of the International Searching Authority, Int'l. App. No. PCT/US2016/037579, dated Oct. 7, 2016, European Patent Office, Rijswijk, NL, 7 pgs.

* cited by examiner

☐ Successful LBT Procedure

▦ Unsuccessful LBT Procedure

CODE BLOCK SEGMENTATION AND RATE MATCHING FOR MULTIPLE TRANSPORT BLOCK TRANSMISSIONS

CROSS REFERENCES

The present Application for Patent claims priority to U.S. Provisional Patent Application No. 62/196,757 by Sun et al., entitled "Code Block Segmentation and Rate Matching for Multiple Transport Block Transmissions," filed Jul. 24, 2015, assigned to the assignee hereof.

BACKGROUND

The present disclosure, for example, relates to wireless communication systems, and more particularly to code block segmentation and rate matching for transmissions that contain code blocks from multiple transport blocks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

A wireless multiple-access communications system may include a number of base stations, each simultaneously supporting communication for multiple communication devices, which may be otherwise known as user equipment (UE). A base station may communicate with UEs on downlink channels (e.g., for transmissions from a base station to a UE) and uplink channels (e.g., for transmissions from a UE to a base station). In some examples, UEs and base stations may use wireless resources from a shared radio frequency spectrum band for downlink or uplink communications, or both, and may perform a listen-before-talk (LBT) procedure to verify that the wireless resources are available for transmission.

In some deployments, UEs and base stations may rely on retransmissions of data in transport blocks (TBs) in order to successfully receive and decode transmitted data. For example, a UE may generate feedback such as an acknowledgment (ACK) or negative acknowledgment (NACK), which may be transmitted to the transmitting base station to indicate whether a TB was successfully received and decoded, which may prompt the base station to retransmit the TB (in case of a NACK feedback). In some cases, TBs may include a number of code blocks (CBs) that are transmitted by a UE or a base station. CB sizes within a TB may be determined by a number of factors, such as, for example, a size of the transport block, coding rate, modulation order, or interleaver characteristics. In certain deployments, feedback may be provided on a CB-basis, rather than a TB basis. In such deployments, efficient techniques for retransmission of CBs from different TBs may be desirable, in order to provide efficient use of wireless resources.

SUMMARY

The present disclosure, for example, relates to techniques for code block (CB) segmentation and rate matching in wireless deployments that may use CB-level feedback. Various aspects of the disclosure provide that a transport block group (TBG) may include one or more CBs from multiple transport blocks (TBs). Such TBGs may support retransmissions of one or more CBs from different TBs within a TBG transmission. In certain examples, a TBG size may be determined, and a retransmission size associated with any CBs to be retransmitted may be determined. Based at least in part on the TBG size and retransmission size, it may be determined whether a new TB may be included in the TBG.

In examples where a new TB may be included in the TBG, a size of the new TB may be determined based at least in part on the TBG size and retransmission size. The new TB may be split into CBs, which may have a different CB size than CBs from one or more prior TBs, and may have a different CB size than other CBs to be transmitted in the TBG. An indication of whether a new TB is included in a TBG may be provided, in some examples. In certain examples, the indication may also include an indication of a number or prior TBs for which CBs may be retransmitted. A receiver may use such an indication to determine a retransmission size, a size of a new TB in a TBG if a new TB is indicated, or rate matching information for retransmitted CBs in a TBG of a new TB is not indicated.

In some examples, a resource grant of wireless transmission resources may be identified for transmitting a TBG that includes CBs from different TBs. A TBG size may be determined based on the resource grant, and a listen-before-talk (LBT) procedure may be performed to confirm the availability of the wireless transmission resources of the resource grant. In the event that less than all of the wireless transmission resources are available based on the LBT procedure, one or more modifications may be made to the associated transmission. Such modification may include, for example, modification of the TBG size, a modification of an encoding rate used for the TBG transmission, a modification of an amount of code blocks for the TBG transmission, or combinations thereof.

A method of wireless communication is described. The method may include identifying a transport block group size for a transmission to a receiver, determining a retransmission size of any code blocks of one or more prior transport blocks to be retransmitted to the receiver during the transmission, and determining whether to transmit a new transport block to the receiver during the transmission based at least in part on the transport block group size and the retransmission size.

An apparatus for wireless communication is described. The apparatus may include means for identifying a transport block group size for a transmission to a receiver, means for determining a retransmission size of any code blocks of one or more prior transport blocks to be retransmitted to the receiver during the transmission, and means for determining whether to transmit a new transport block to the receiver during the transmission based at least in part on the transport block group size and the retransmission size.

A further apparatus for wireless communication is described. The apparatus may include a processor, memory in electronic communication with the processor, and instructions stored in the memory and operable, when executed by the processor, to cause the apparatus to identify a transport block group size for a transmission to a receiver, determine a retransmission size of any code blocks of one or more prior transport blocks to be retransmitted to the receiver during the transmission, and determine whether to transmit a new transport block to the receiver during the transmission based at least in part on the transport block group size and the retransmission size.

A non-transitory computer-readable medium storing code for wireless communication is described. The code may include instructions executable to identify a transport block group size for a transmission to a receiver, determine a retransmission size of any code blocks of one or more prior transport blocks to be retransmitted to the receiver during the transmission, and determine whether to transmit a new transport block to the receiver during the transmission based at least in part on the transport block group size and the retransmission size.

Some examples of the method, apparatuses, or non-transitory computer-readable medium described herein may further include processes, features, means, or instructions for transmitting code blocks from two or more different transport blocks in the transport block group during the transmission. Additionally or alternatively, some examples may include processes, features, means, or instructions for determining to transmit the new transport block to the receiver when the transport block group size exceeds the retransmission size.

Some examples of the method, apparatuses, or non-transitory computer-readable medium described herein may further include processes, features, means, or instructions for determining a size of the new transport block based at least in part on a difference between the transport block group size and the retransmission size. Additionally or alternatively, in some examples the determining the retransmission size may include determining that one or more code blocks from the one or more prior transport blocks transmitted to the receiver are to be retransmitted to the receiver, and aggregating code block sizes of the one or more code blocks that are to be retransmitted.

In some examples of the method, apparatuses, or non-transitory computer-readable medium described herein, the determining that the one or more code blocks from the one or more prior transport blocks are to be retransmitted to the receiver may include determining that a negative acknowledgment (NACK) is associated with the one or more code blocks. Additionally or alternatively, in some examples the transport block group size is determined based at least in part on one or more of a number of resource blocks in wireless resources assigned for the transmission, a number of transmission time intervals in the wireless resources assigned for the transmission, a number of spatial multiplexing layers used for the transmission, or a modulation and coding scheme used for the transmission.

Some examples of the method, apparatuses, or non-transitory computer-readable medium described herein may further include processes, features, means, or instructions for transmitting an indication of whether the new transport block is to be transmitted during the transmission. Additionally or alternatively, some examples may include processes, features, means, or instructions for identifying a number of consecutive prior transport blocks that may have code blocks retransmitted during the transmission, and discarding code blocks to be retransmitted that are associated with transport blocks prior to the number of consecutive prior transport blocks that may have code blocks retransmitted during the transmission.

In some examples of the method, apparatuses, or non-transitory computer-readable medium described herein, the retransmission size is determined based at least in part on a sum of code block sizes of code blocks to be retransmitted. Additionally or alternatively, some examples may include processes, features, means, or instructions for transmitting an indication of the number of consecutive prior transport blocks that may have code blocks retransmitted during the transmission.

Some examples of the method, apparatuses, or non-transitory computer-readable medium described herein may further include processes, features, means, or instructions for determining that a difference between the transport block group size and the retransmission size supports including only the code blocks of the one or more prior transport blocks to be retransmitted to the receiver in the transmission. Additionally or alternatively, some examples may include processes, features, means, or instructions for determining a number of coded bits to be included in the transmission, and proportionally assigning the number of coded bits to the code blocks of the one or more prior transport blocks to be retransmitted to the receiver in the transmission.

In some examples of the method, apparatuses, or non-transitory computer-readable medium described herein, the prior transport blocks include two or more prior transport blocks, and the code blocks to be retransmitted for the prior transport blocks have different code block sizes. Additionally or alternatively, some examples may include processes, features, means, or instructions for determining that a difference between the transport block group size and the retransmission size supports including the new transport block in the transmission.

In some examples of the method, apparatuses, or non-transitory computer-readable medium described herein, a new transport block size of the new transport block is determined based at least in part on a difference between the transport block group size and the retransmission size. Additionally or alternatively, some examples may include processes, features, means, or instructions for dividing the new transport block size into a plurality of code blocks for the new transport block.

In some examples of the method, apparatuses, or non-transitory computer-readable medium described herein, a size of the plurality of code blocks for the new transport block is selected to provide uniform code block sizes for the new transport block that occupies substantially all of the difference between the transport block group size and the retransmission size. Additionally or alternatively, in some examples determining that a difference between the transport block group size and the retransmission size supports including the new transport block in the transmission may include determining that the difference between the transport block group size and the retransmission size exceeds a threshold value.

In some examples of the method, apparatuses, or non-transitory computer-readable medium described herein, the threshold value is determined based at least in part on one or more of a code block size for code blocks to be retransmitted, a ratio of the transport block group size and the retransmission size, or a modulation and coding scheme for the transmission. Additionally or alternatively, some examples may include processes, features, means, or instructions for determining a number of coded bits to be included in the transmission, determining a code block size of one or more code blocks to be retransmitted to the receiver and of one or more new code blocks of the new transport block to be transmitted to the receiver, and proportionally assigning portions of the number of coded bits to each code block in proportion to the respective code block size.

In some examples of the method, apparatuses, or non-transitory computer-readable medium described herein, the number of coded bits are transmitted in a plurality of resource elements, and the coded bits of each resource element are associated with a same code block. Additionally or alternatively, in some examples the transmission to the receiver is a spatially multiplexed transmission on two or more spatial multiplexing layers, and a modulation and coding scheme (MCS) of each spatial multiplexing layer is determined independently of the modulation and coding scheme (MCS) for other of the spatial multiplexing layers.

Some examples of the method, apparatuses, or non-transitory computer-readable medium described herein may further include processes, features, means, or instructions for identifying the transport block group size for each spatial multiplexing layer, and determining the retransmission size of any code blocks of one or more prior transport blocks to be retransmitted to the receiver during the transmission for each spatial multiplexing layer. Additionally or alternatively, some examples may include processes, features, means, or instructions for transmitting an indication that a new transport block is to be transmitted during the transmission. In some examples the indication may include a one-bit indicator, and a new transport block is transmitted on each spatial multiplexing layer that has a retransmission size that is less than the transport block group size. Additionally or alternatively, in some examples the indication is a multi-bit indicator that provides an indication of whether a new transport block is transmitted on each spatial multiplexing layer. In some examples the indication may include a one-bit indicator, and a new transport block is transmitted on each spatial multiplexing layer in which the transport block group size exceeds the retransmission size for the respective spatial multiplexing layer by at least a threshold value. Additionally or alternatively, some examples may include processes, features, means, or instructions for coding block retransmissions remain in a same spatial multiplexing layer as original code block transmissions.

A method of wireless communication is described in another aspect of the disclosure. The method may include identifying a transport block group size for a transmission, receiving an indication of whether code blocks from two or more transport blocks are to be included in the transmission, and determining a code block size for code blocks from the two or more transport blocks based at least in part on the transport block group size and the indication.

An apparatus for wireless communication is described in another aspect of the disclosure. The apparatus may include means for identifying a transport block group size for a transmission, means for receiving an indication of whether code blocks from two or more transport blocks are to be included in the transmission, and means for determining a code block size for code blocks from the two or more transport blocks based at least in part on the transport block group size and the indication.

A further apparatus for wireless communication is described in another aspect of the disclosure. The apparatus may include a processor, memory in electronic communication with the processor, and instructions stored in the memory and operable, when executed by the processor, to cause the apparatus to identify a transport block group size for a transmission, receive an indication of whether code blocks from two or more transport blocks are to be included in the transmission, and determine a code block size for code blocks from the two or more transport blocks based at least in part on the transport block group size and the indication.

A non-transitory computer-readable medium storing code for wireless communication is described in another aspect of the disclosure. The code may include instructions executable to identify a transport block group size for a transmission, receive an indication of whether code blocks from two or more transport blocks are to be included in the transmission, and determine a code block size for code blocks from the two or more transport blocks based at least in part on the transport block group size and the indication.

Some examples of the method, apparatuses, or non-transitory computer-readable medium described herein may further include processes, features, means, or instructions for identifying a number of consecutive prior transport blocks that may have code blocks retransmitted during the transmission, and discarding information related to code blocks that are associated with transport blocks prior to the number of consecutive prior transport blocks that may have code blocks retransmitted during the transmission. Additionally or alternatively, in some examples identifying the number of consecutive prior transport blocks that may have code blocks retransmitted during the transmission may include receiving, from a transmitter, an indication of the number of consecutive prior transport blocks that may have code blocks retransmitted during the transmission.

Some examples of the method, apparatuses, or non-transitory computer-readable medium described herein may further include processes, features, means, or instructions for determining a retransmission size of code blocks of one or more prior transport blocks to be retransmitted during the transmission. Additionally or alternatively, some examples may include processes, features, means, or instructions for determining a size of the new transport block based at least in part on a difference between the transport block group size and the retransmission size.

In some examples of the method, apparatuses, or non-transitory computer-readable medium described herein, the transmission is a spatially multiplexed transmission on two or more spatial multiplexing layers, and identifying the transport block group size may include identifying the transport block group size for each spatial multiplexing layer. Additionally or alternatively, some examples may include processes, features, means, or instructions for receiving an indication that a new transport block is to be transmitted during the transmission. In some examples, the indication may include a one-bit indicator, and a new transport block is transmitted on each spatial multiplexing layer that has a retransmission size that is less than the transport block group size. In other examples, the indication is a multi-bit indicator that provides an indication of whether a new transport block is transmitted on each spatial multiplexing layer. In further examples, the indication may include a one-bit indicator, and a new transport block is transmitted on each spatial multiplexing layer in which the transport block group size exceeds the retransmission size for the respective spatial multiplexing layer by at least a threshold value.

A method of wireless communication is described in another aspect of the disclosure. The method may include receiving a resource grant for an uplink transmission, the resource grant identifying uplink transmission resources for the uplink transmission, determining, based at least in part on the resource grant, a transport block group size for a transport block group to be transmitted in the uplink transmission, the transport block group including a plurality of code blocks from two or more transport blocks to be transmitted in the uplink transmission, performing a listen-before-talk (LBT) procedure for a wireless communication channel to be used for the uplink transmission to determine availability of the wireless communication channel for the uplink transmission resources, and modifying one or more of the transport block group size, an encoding rate, or an amount of code blocks for the uplink transmission based on the LBT procedure indicating the wireless communication channel is unavailable for a portion of the uplink transmission resources.

An apparatus for wireless communication is described in another aspect of the disclosure. The apparatus may include means for receiving a resource grant for an uplink transmission, the resource grant identifying uplink transmission resources for the uplink transmission, means for determining, based on the resource grant, a transport block group size for a transport block group to be transmitted in the uplink transmission, the transport block group including a plurality of code blocks from two or more transport blocks to be transmitted in the uplink transmission, means for performing a listen-before-talk (LBT) procedure for a wireless communication channel to be used for the uplink transmission to determine availability of the wireless communication channel for the uplink transmission resources, and means for modifying one or more of the transport block group size, an encoding rate, or an amount of code blocks for the uplink transmission based on the LBT procedure indicating the wireless communication channel is unavailable for a portion of the uplink transmission resources.

A further apparatus for wireless communication is described in another aspect of the disclosure. The apparatus may include a processor, memory in electronic communication with the processor, and instructions stored in the memory and operable, when executed by the processor, to cause the apparatus to receive a resource grant for an uplink transmission, the resource grant identifying uplink transmission resources for the uplink transmission, determine, based on the resource grant, a transport block group size for a transport block group to be transmitted in the uplink transmission, the transport block group including a plurality of code blocks from two or more transport blocks to be transmitted in the uplink transmission, perform a listen-before-talk (LBT) procedure for a wireless communication channel to be used for the uplink transmission to determine availability of the wireless communication channel for the uplink transmission resources, and modify one or more of the transport block group size, an encoding rate, or an amount of code blocks for the uplink transmission based on the LBT procedure indicating the wireless communication channel is unavailable for a portion of the uplink transmission resources.

A non-transitory computer-readable medium storing code for wireless communication is described in another aspect of the disclosure. The code may include instructions executable to receive a resource grant for an uplink transmission, the resource grant identifying uplink transmission resources for the uplink transmission, determine, based on the resource grant, a transport block group size for a transport block group to be transmitted in the uplink transmission, the transport block group including a plurality of code blocks from two or more transport blocks to be transmitted in the uplink transmission, perform a listen-before-talk (LBT) procedure for a wireless communication channel to be used for the uplink transmission to determine availability of the wireless communication channel for the uplink transmission resources, and modify one or more of the transport block group size, an encoding rate, or an amount of code blocks for the uplink transmission based on the LBT procedure indicating the wireless communication channel is unavailable for a portion of the uplink transmission resources.

In some examples of the method, apparatuses, or non-transitory computer-readable medium described herein, the plurality of code blocks comprise at least a first code block from a first transport block and a second code block from a second transport block, and the code block sizes of the first code block and second code block are different. Additionally or alternatively, in some examples the uplink transmission resources comprise two or more transmission time intervals (TTIs) for the uplink transmission, the LBT procedure is performed for a first transmission time interval (TTI), and the LBT procedure is performed for a second TTI when the LBT procedure for the first TTI is unsuccessful. In some examples, the modifying is performed based on the unsuccessful LBT procedure for the first TTI.

Additionally or alternatively, in some examples the uplink transmission resources comprise two or more frequency resources for the uplink transmission, and the LBT procedure is performed for the frequency resources. In some examples, the modifying is performed based on the LBT procedure indicating the wireless communication channel is unavailable for one or more of the frequency resources for the uplink transmission. Additionally or alternatively, in some examples the two or more frequency resources comprise interlaces on two or more wireless communications channels.

In some examples of the method, apparatuses, or non-transitory computer-readable medium described herein, the modifying may include determining available resources for the uplink transmission, and modifying a coding rate to support transmission of the plurality of code blocks in the available resources. Additionally or alternatively, in some examples the coding rate is modified to allocate modulation symbols for the plurality of code blocks based on a size of each respective code block.

In some examples of the method, apparatuses, or non-transitory computer-readable medium described herein, the modifying may include determining available resources for the uplink transmission, and identifying a portion of the plurality of code blocks to be transmitted in the available resources. Additionally or alternatively, in some examples identifying the portion the code blocks to be transmitted in the available resources may include sequentially packing coded bits of the plurality of code blocks into the available resources, and dropping remaining coded bits after all of the available resources are occupied.

In some examples of the method, apparatuses, or non-transitory computer-readable medium described herein, the modifying may include determining available resources for the uplink transmission, modifying the transport block group size based on the available resources, and dropping one or more of the code blocks based on the modified transport block group size. Additionally or alternatively, in some examples modifying the transport block group size further may include determining one or more of the plurality of code blocks are to be dropped from the uplink transmission.

In some examples of the method, apparatuses, or non-transitory computer-readable medium described herein, the plurality of code blocks may include retransmission code blocks from one or more prior transport blocks and new code blocks from a new transport block, and g one or more of the new code blocks may be regenerated based on the modified transport block group size.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
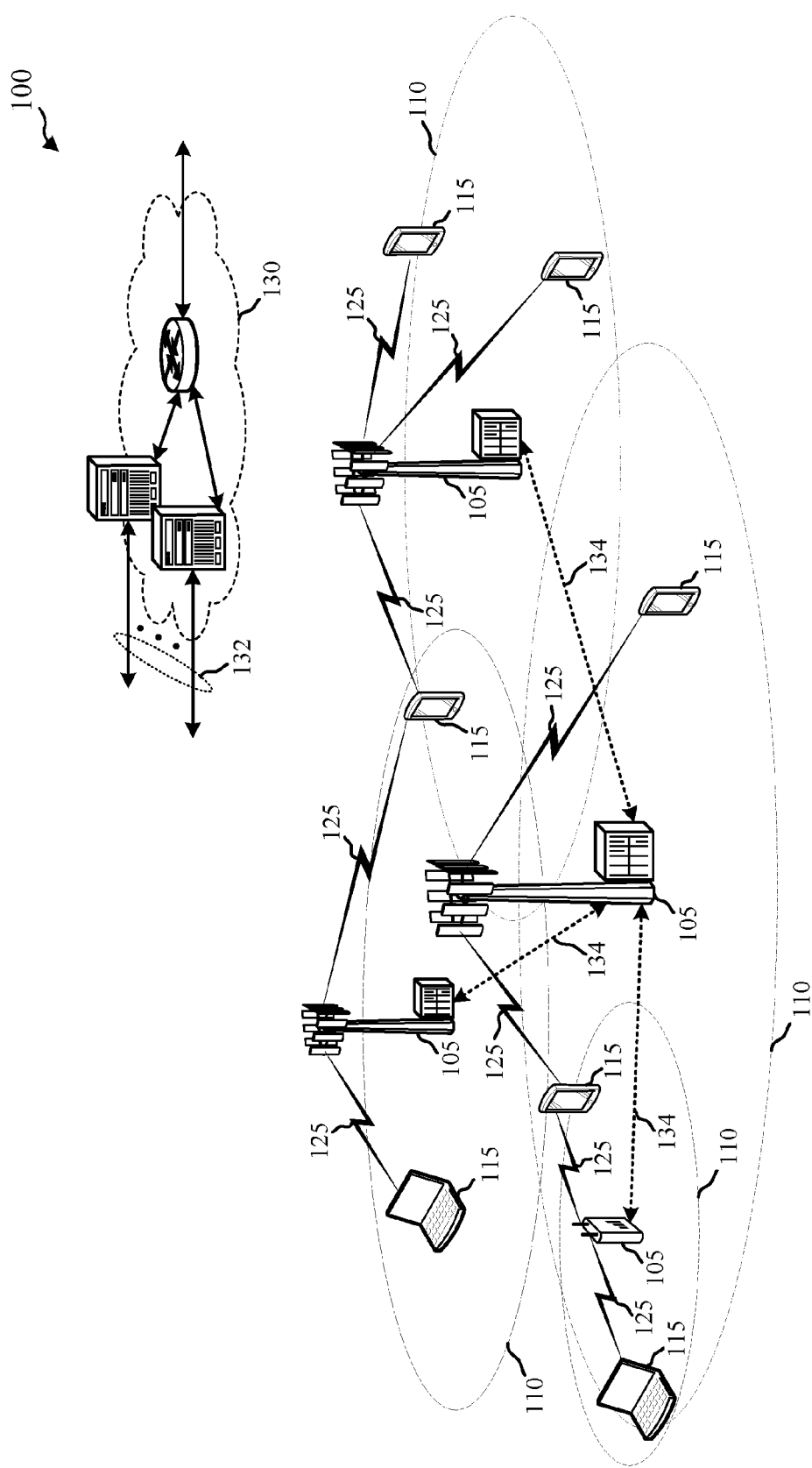
FIG. 1 illustrates an example of a wireless communications system that supports code block segmentation and rate matching for multiple transport block transmissions in accordance with various aspects of the present disclosure.

Techniques for code block (CB) segmentation and rate matching for transmission of multiple transport blocks (TBs) in a wireless communication system are described. As mentioned above, a wireless communications device, such as a UE or base station, may rely on retransmissions of data, such as CBs, to successfully decode data in the transmissions. Furthermore, in various aspects of the disclosure, acknowledgment/negative-acknowledgment (ACK/NACK) feedback may be provided on a CB-level, rather than a TB-level. In such aspects, CBs from different TBs may be transmitted in a same transport block group (TBG) transmission. Additionally, such different CBs may have a different CB size within the TBG transmission. In some examples, CBs from a new TB may be included along with retransmitted CBs from one or more prior TBs in a TBG transmission.

CB-level feedback may be utilized, in some examples, in deployments that operate using shared radio frequency spectrum bands. Such deployments may have a relatively high incidence of "bursty" interference, in which intermittent interference lasting a relatively short duration may result in unsuccessful reception and decoding of a number of CBs. If TB-level feedback were used in such deployments, an entire TB may be retransmitted due to interference that affected only a relatively small portion of the TB. Using CB-level feedback in such scenarios may provide for more efficient use of wireless resources through retransmission on only the CBs that are affected by interference, rather than an entire TB. Such techniques may provide enhanced efficiency in situations, such as mentioned, where bursty interference occurs relatively frequently. When doing TB-level feedback, an entire TB is retransmitted in the event of a negative acknowledgment (NACK). However, when doing CB-level feedback, a NACK may be received for only a few CBs of a TB, which may be retransmitted. Since the entire TB is not retransmitted, CBs from multiple different TBs, according to various aspects of the disclosure, may be transmitted in what is referred to herein as a transport block group (TBG), which may include CBs from multiple different TBs.

According to some aspects of the disclosure, a TBG size for a transmission may be determined. Such a TBG size may be determined based on, for example, available resources such as resource blocks (RBs), a number of transmission time intervals (TTIs), or a spatial multiplexing rank, as well as a modulation and coding scheme (MCS) for the transmission (e.g., modulation order and coding rate). Using such resource information, a number of available modulation symbols may be determined (e.g., by counting available resource elements), a number of available coded bits may be determined (e.g., by multiplying the modulation order implied by the MCS), and a number of available information bits for the transmission may be determined (e.g., by using the data rate implied by the MCS). A retransmission size may then be determined based on a number of CBs that are to be retransmitted in the TBG. If sufficient resources remain of the TBG in excess of the retransmission size, it may be determined that a new TB is to be transmitted in the TBG. A TB size for the new TB may be determined based on a difference between the TBG size and the retransmission size, and the new TB may be split into two or more CBs, which may have a different CB size than other CBs to be retransmitted in the TBG. Aspects of the present disclosure provide techniques for segmentation of CBs of a new CB and retransmission CBs, as well as rate matching by allocating coded bits proportional to a CB length for the coded bits. Additionally, in some examples, spatial multiplexing aspects of CB segmentation and rate matching are addressed. Furthermore, aspects of the disclosure provide techniques for modifying uplink transmissions based on wireless resources available after performing a listen-before-talk (LBT) procedure in a shared radio frequency spectrum band.

Aspects of the disclosure are initially described in the context of a wireless communication system. Specific examples are then described for TBGs that may include CBs from multiple different TBs. These and other aspects of the disclosure are further illustrated by and described with reference to apparatus diagrams, system diagrams, and flowcharts that relate to memory management for reception of wireless communications.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As mentioned above, UEs 115 or base stations 105 may rely on retransmissions of data, such as CBs, to successfully decode data in the transmissions. Hybrid automatic repeat request (HARQ) feedback is one technique of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data (e.g., log likelihood ratio (LLR) data for a CB) may be stored in a buffer and combined with subsequent transmissions to improve the overall likelihood of successfully decoding the data. In some cases, redundancy bits are added to each message prior to transmission. Redundancy bits may be identified by a redundancy version identification (RVID), and transmission of redundancy bits may be particularly useful in situations with poor channel conditions. In other cases, redundancy bits are not added to each transmission, but may be retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

In some cases, wireless communications system 100 may utilize one or more enhanced component carriers (eCCs). An enhanced component carrier (eCC) may be characterized by one or more features including: flexible bandwidth, different transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). When using shared spectrum, a transmitter may perform a LBT procedure prior to transmitting on a wireless channel to confirm that the channel is available for transmission. An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from downlink (DL) to uplink (UL) operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Various aspects of the present disclosure provide for CB segmentation and rate matching for transmission of multiple TBs within a TBG. As mentioned above, various aspects of the disclosure provide for acknowledgment/negative-acknowledgment (ACK/NACK) feedback that is provided on a CB-level, rather than a TB-level. In such aspects, CBs from different TBs may be transmitted in a same TBG transmission, and the different CBs may have different CB sizes within the TBG transmission. In some examples, CBs from a new TB may be included along with retransmitted CBs from one or more prior TBs in a TBG transmission. According to some aspects of the disclosure, a TBG size for a transmission may be determined, and a retransmission size may then be determined based on a number of CBs that are to be retransmitted in the TBG. If sufficient resources remain of the TBG in excess of the retransmission size, it may be determined that a new TB is to be transmitted in the TBG, with a TB size for the new TB determined based on a difference between the TBG size and the retransmission size. The new TB may be split into two or more CBs, which may have a different CB size than other CBs to be retransmitted in the TBG. Certain aspects of the present disclosure provide techniques for segmentation of CBs of a new CB and retransmission CBs, as well as rate matching by allocating coded bits proportional to a CB length for the coded bits. Additionally, in some examples, spatial multiplexing aspects of CB segmentation and rate matching are addressed. Furthermore, aspects of the disclosure provide techniques for modifying uplink transmissions based on wireless resources available after performing a listen-before-talk (LBT) procedure in a shared radio frequency spectrum band.

Figure 2:
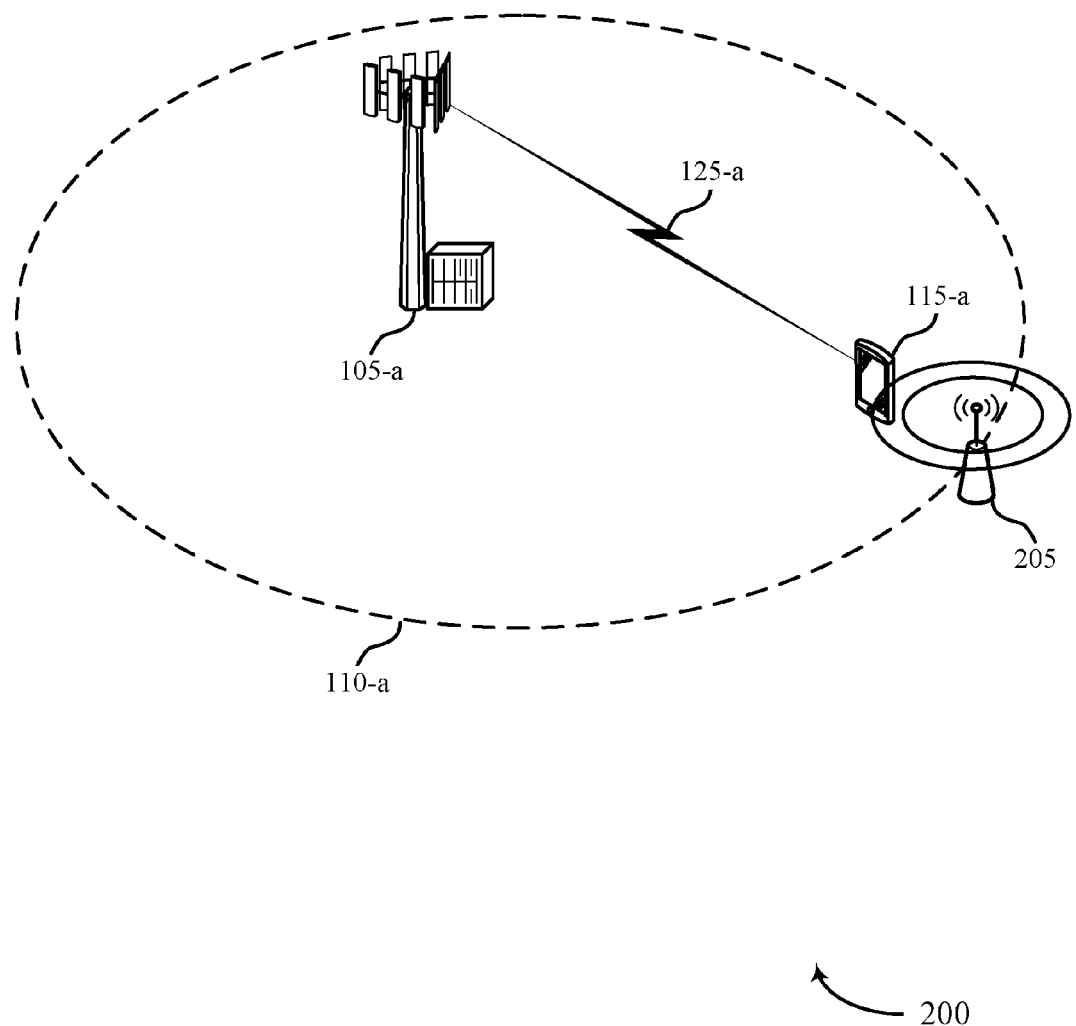
FIG. 2 illustrates an example of a wireless communications subsystem that supports code block segmentation and rate matching for multiple transport block transmissions in accordance with various aspects of the present disclosure.

FIG. 2 illustrates an example of a wireless communications subsystem 200 for code block segmentation and rate matching for multiple transport block transmissions in accordance with various aspects of the present disclosure. Wireless communications subsystem 200 may include a device 115-a and base station 105-a, which may be examples of a UE 115 base station 105 described with reference to FIG. 1. Base station 105-a may have a coverage area 110-a and communicate with device 115-a via communications link 125-a. In some examples, communications link 125-a may use a shared channel in a shared radio frequency spectrum band.

In the example of FIG. 2, a Wi-Fi node 205 may be located near UE 115-a, and may interfere with transmissions between the UE 115-a and base station 105-a. For example, Wi-Fi node 205 may transmit bursty interference that may result in one or more CBs of a TBG not being successfully received by either the UE 115-a or base station 105-a. For example, if Wi-Fi node 105 transmits during the DL portion of the radio frame, UE 115-a may experience interference and not properly receive and decode one or more CBs from base station 105-a. In response, the UE 115-a may transmit a NACK for the unsuccessfully received CBs, which may prompt the base station 105-a to retransmit the CBs having NACK feedback. In some examples, as will be described in more detail below, base station 105-a and UE 115-a may determine TBG sizes, retransmission sizes of CBs to be retransmitted in a TBG, and new TB sizes for a transmission. Additionally, allocation of coded bits proportional to CB length may be provided for the different CBs, providing rate matching based on the TBG size, retransmission size, the new size, or combinations thereof. Such techniques may be provided on two or more spatial multiplexing layers, according to some aspects of the disclosure. Furthermore, in some aspects of the disclosure, UE 115-a may modify an UL transmission when a LBT procedure indicates that wireless resources are not available for one or more portions of an uplink grant. While only one UE 115-a is illustrated in FIG. 2, many UEs 115 may be in communication with base station 105-a.

Figure 3:
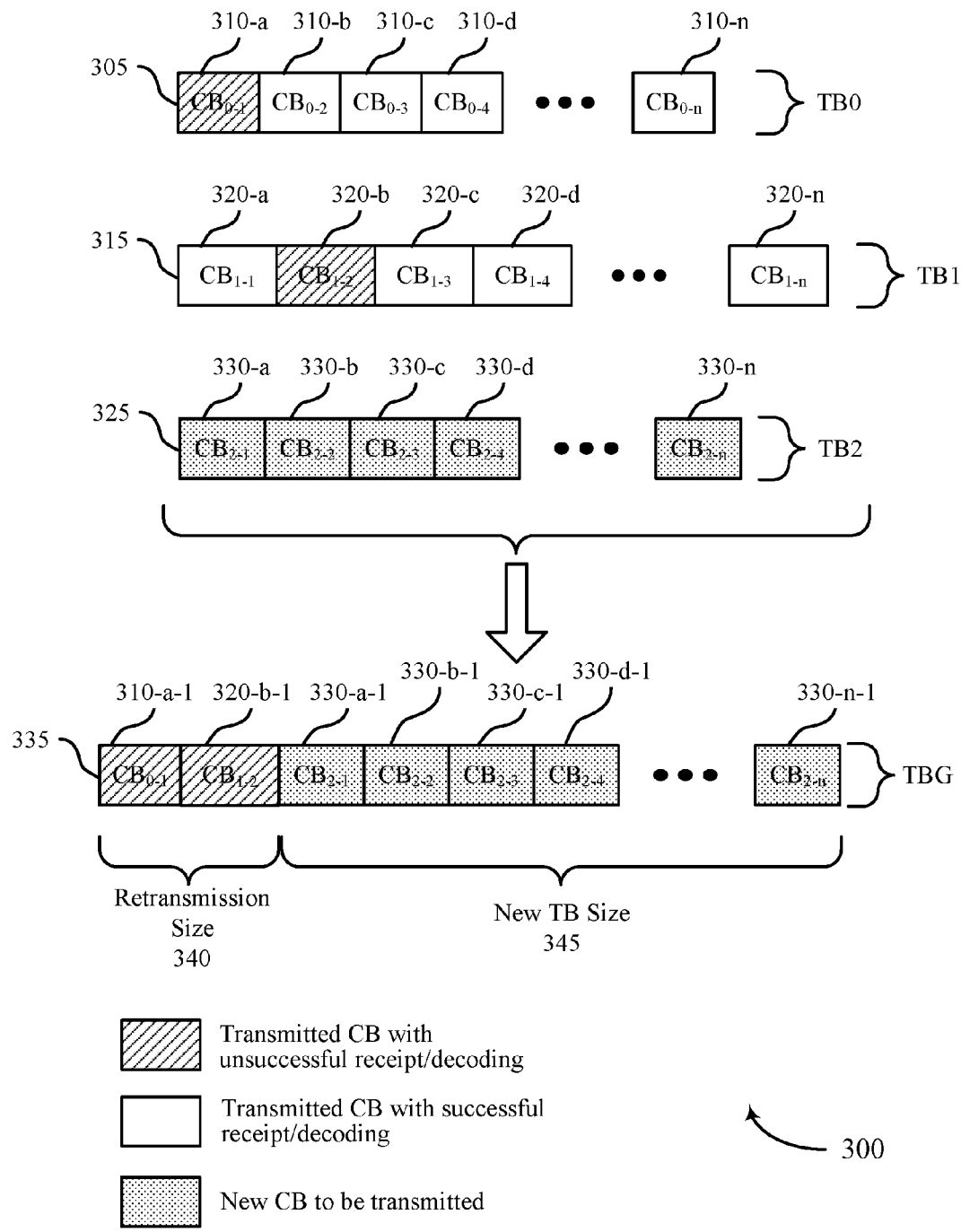
FIG. 3 illustrates an example of different transport blocks and a transport block group for multiple transport block transmissions in accordance with various aspects of the present disclosure.

FIG. 3 illustrates an example 300 of different transport blocks and a transport block group for multiple transport block transmissions in accordance with various aspects of the present disclosure. In the example of FIG. 3, a first transport block TB0 305 may include CBs 310. A second transport block TB1 315 may include CBs 320, and a third transport block 325 may be a new TB and include CBs 330. TBs 305, 315, and 325 may be transmitted between a base station and a UE, such as between base stations 105 and UEs 115 described with reference to FIGS. 1-2.

In this example, TB0 305 may have been transmitted with a previous TBG, and may include $CB_{0-1}$ 310-a, $CB_{0-2}$ 310-b, $CB_{0-3}$ 310-c, $CB_{0-4}$ 310-d, through $CB_{0-n}$ 310-n. For example, TB0 305 may be a downlink TB to a UE, and the reception at the UE is unsuccessful for $CB_{0-1}$ 310-a, and successful for the remaining CBs 310 of TB0 305. The UE, following reception of TB0 305, may generate HARQ feedback which includes a NACK feedback for $CB_{0-1}$ 310-a. Similarly, in this example, TB1 315 may have been transmitted with a previous TBG and may include $CB_{1-1}$ 320-a, $CB_{1-2}$ 320-b, $CB_{1-3}$ 320-c, $CB_{1-4}$ 320-d, through $CB_{1-n}$ 320-n. TB1 315 may be a downlink TB to the UE, and the reception at the UE is unsuccessful for $CB_{1-2}$ 320-b, and successful for the remaining CBs 320 of TB1 315. The UE, following reception of TB0 315, may generate HARQ feedback which includes a NACK feedback for $CB_{1-2}$ 320-b. The size of the CBs 310 of TB0 305 may be a different size than the CBs 320 of TB1 315. TB2 325, as mentioned above, may be a new TB, and may include $CB_{2-1}$ 330-a, $CB_{2-2}$ 330-b, $CB_{2-3}$ 330-c, $CB_{2-4}$ 330-d, through $CB_{2-n}$ 330-n. TB2 325 may be a downlink TB that is to be transmitted the UE.

As discussed above, in various aspects of the present disclosure, CB-based feedback may be provided for transmissions between a UE and a base station. In the example of FIG. 3, such CB-based feedback may include HARQ feedback for each of the transmitted CBs 310 and 320, and in this example the UE may have transmitted a NACK feedback for both $CB_{0-1}$ 310-a and $CB_{1-2}$ 320-b. The base station, upon reception of the NACK feedback for $CB_{0-1}$ 310-a and $CB_{1-2}$ 320-b may retransmit these CBs, which may be retransmitted with a RVID indicating a retransmission. In some examples, as mentioned above, retransmitted CBs may be transmitted in a TBG that may include CBs from multiple TBs. In the example of FIG. 3, a TBG 335 may include retransmitted versions of $CB_{0-1}$ 310-a-1 and $CB_{1-2}$ 320-b-1. TBG 335 in this example may also include new TB 325 which includes $CB_{2-1}$ 330-a-1, $CB_{2-2}$ 330-b-1, $CB_{2-3}$ 330- c-1, CB$_{2\text{-}4}$ 330-d-1, through CB$_{2\text{-}n}$ 330-n-1. Also as discussed above, the size of CBs 310, CBs 320, and CBs 330 may be different.

When determining that a new TB, such as TB2 325, may be transmitted in a TBG, such as TBG 335, a UE or base station that is to transmit the TBG 335 may initially identify a TBG Size. For example, a base station may calculate a TBG size for a downlink transmission to a UE. In some examples, the TBG 335 size, L, may be calculated in a similar manner as a legacy TB size for a DL grant. The DL grant may include assigned resources, such as an assigned number of RBs, number of TTIs, rank, or combinations thereof. The DL grant may also include MCS information, which may be used to infer modulation order and code rate. A number of available modulation symbols may be calculated by counting available REs, and a number of available code bits may be calculated by multiplying the modulation order implied by the MCS. A number of information bits may then be calculated using the data rate implied by the MCS, which may provide a size for the TBG 335. A retransmission size 340 may then be determined as an aggregated size of the CBs to be retransmitted in the TBG 335. In the example of FIG. 3, the retransmission size 340 is the aggregated size of retransmitted versions of CB$_{0\text{-}1}$ 310-a-1 and CB$_{1\text{-}2}$ 320-b-1. Based on the retransmission size 340 and the TBG size, a new TB size 345 may be determined as a difference between the retransmission size and the TBG size.

In some examples, a number of prior transport blocks (NumTB) that may have retransmitted CBs may be determined, and CBs from TBs transmitted prior to the oldest TB for retransmission may be dropped. For example, in FIG. 3, NumTB may be 2, indicating that CBs 310, 320 from two prior TBs TB1 315 and TB0 305, may be retransmitted. If any CBs from a prior TB (e.g., a TB transmitted prior to TB0 305) still remain to be retransmitted, these CBs may be dropped. Retransmissions of such dropped CBs may be initiated through higher layer retransmissions, for example. The value of NumTB may be established based on one or more of a number of factors, such as an amount of data in a queue to be transmitted, an amount of other network traffic, channel conditions, to name but a few examples. NumTB may be mapped to certain conditions, or may be semi-statically or dynamically signaled. In some examples, an indication of the NumTB may be transmitted with wireless resource grant information. Based on the NumTB, it may be determined which CBs remain to be retransmitted, and each of the remaining retransmission CBs may each have a length $l_k$, which may be aggregated to determine the retransmission size calculated, in some examples, as L'=$\Sigma l_k$. If L>L', it may be determined that a new TB, such as TB2 325 of FIG. 3, may be transmitted.

In some examples, a wireless resource grant may indicate if new data is to be transmitted in a TBG, which may be signaled as an "NDI" indicator according to various examples. The combination of NDI and L vs L' may provide a number of combinations. One combination may be where NDI=1 and L>L', in which a new TB may be added with new TB size $L_0$=L-L'. Another combination may be where NDI=1 and L≤L', which results in an invalid case where the number of retransmissions meets or exceeds the total TBG size and new data is to be transmitted. Such a situation may be used for pruning, to eliminate older TBs that still have remaining CBs to be retransmitted, and NumTB may be decremented until L>L'. Still another combination may be where NDI=0 and L>L' or L≤L', in which case all coded bits may be proportionally assigned to retransmission CBs.

In some examples, when NDI=1 and L>L', $L_0$ may be split into code blocks using similar techniques as used in legacy transmissions, in which relatively large CB size may be selected and the CBs in a TB may be selected to have close to a uniform CB size. Thus, using such techniques, a CB size for a new TB (e.g., size of CBs 330 of TB2 325 in FIG. 3) may be determined, which may be a different CB size than used in prior transmitted TBs TB0 305 and TB1 315. In some examples, the value of L may be only slightly larger than L', and adding a new TB to a TBG may not provide enhanced efficiency. In such a case, the value of a new TB indicator, such as a value of NDI indicator as discussed above, may still be set to indicate that no new TB is being transmitted. In some examples, a threshold value may be provided for including a new TB in a TBG. Such a threshold value may be determined, in some examples, based on one or more of a CB size for code blocks to be retransmitted, a ratio of the TBG size and the retransmission size, or a modulation and coding scheme for the transmission.

A receiver of the different TBs 305, 315, 325, such as a UE or base station, may maintain several items of CB-related information. For example, a receiver, for each CB, may maintain which TB that a CB is from along with the CB position within the TB. This information may be used to reassemble the TB following successful reception and decoding of all of the CBs of the TB. The receiver may also maintain a number of information bits for each TB, a location of the CB in a HARQ LLR buffer for CBs to be retransmitted, a location of decoded CBs in a decoded bit buffer, and in indication of a decoding pass or fail for each CB. The receiver may use these various items of information in receiving a new TBG having CBs from multiple TBs, to decode and reassemble received TBs.

As mentioned above, various aspects of the present disclosure also provide rate matching for transmitted CBs, which may be used to provide allocation of coded bits proportional to CB length. In some examples, for a given wireless resource assignment the number of coded bits, M, may be identified. In certain examples, the M coded bits may be split proportional to the number of information bits in each CB. In some legacy deployments, coded bits M may be uniformly split, because the CBs of such deployments are of approximately equal size. However, according to examples of the present disclosure, CB size within a TBG may not be uniform due to CB level retransmission and mixing of multiple TBs in one TBG. In some examples, the coded bits in one resource element (RE) are selected so as not to span multiple CBs, which may result in slight variances in CB size, but an overall relatively uniform CB size for CBs within a TB. In some examples, U may be defined as number of coded bits in one RE (e.g., modulation order times spatial multiplexing rank). A value M'=M/U may be defined as the number of assignment units. For a given CB, k, with $l_k$ information bits, a value l may be defined as l=$\Sigma l_k$. Values $m_k$ and $\Delta$ may be defined as $$m_k = \left\lfloor \left(\frac{M'}{l}\right) l_k \right\rfloor,$$

and $\Delta$=M'−$\Sigma m_k$, according to certain examples. Coded bits may then be assigned to provide ($m_k$+1)U coded bits to the first $\Delta$ CBs and $m_k$U coded bits to the rest of the CBs. Thus, in examples, coded bits are allocated proportional to CB length.

When a receiver is demapping and decoding received CBs, given the rate matching information, a demapper may compute LLRs and sequentially combine them with the LLR buffer content of each CB. In some examples, a decoder may sequentially process each CB, and if a CB decoding passes the decoder may mark the CB as decoded and deliver the information bits to the TB, and may clear the associated HARQ LLR buffer. In the event of a CB decoding failure, a NACK feedback may be generated and an LLR value for the CB may be off-loaded to the HARQ LLR buffer to await retransmission.

Figure 4A:
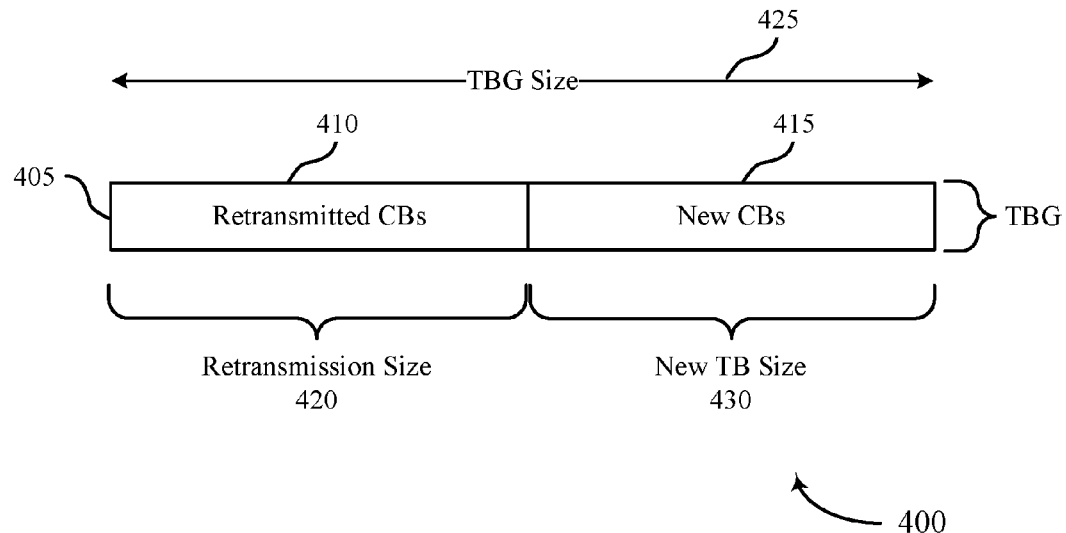
FIGS. 4A and 4B illustrate examples of different resources of transport block groups used for retransmissions of code blocks and transmissions of new transport blocks in accordance with various aspects of the present disclosure.

As described above, a new TB size may be determined based on a total TBG size and a retransmission size. FIG. 4A illustrates an example 400 of a TBG 405 that may include retransmitted CBs 410 and new CBs 415, in accordance with various aspects of the present disclosure. TBG 405 may be transmitted between a UE 115 and base station 105 such as described with reference to FIGS. 1-2. In the example of FIG. 4A, retransmitted CBs 410, which may include retransmitted CBs from multiple previously transmitted TBs, and which may include different CBs that have different CB sizes, may have a retransmission size 420. A total TBG size 425 also may be determined, in a manner such as discussed above with respect to FIG. 3. New TB size 430 may then be determined based on a difference between retransmission size 420 and TBG size 425. In the example of FIG. 4A, the difference between the retransmission size 420 and the TBG size 425 is large enough to support a new TB transmission.

Figure 4B:
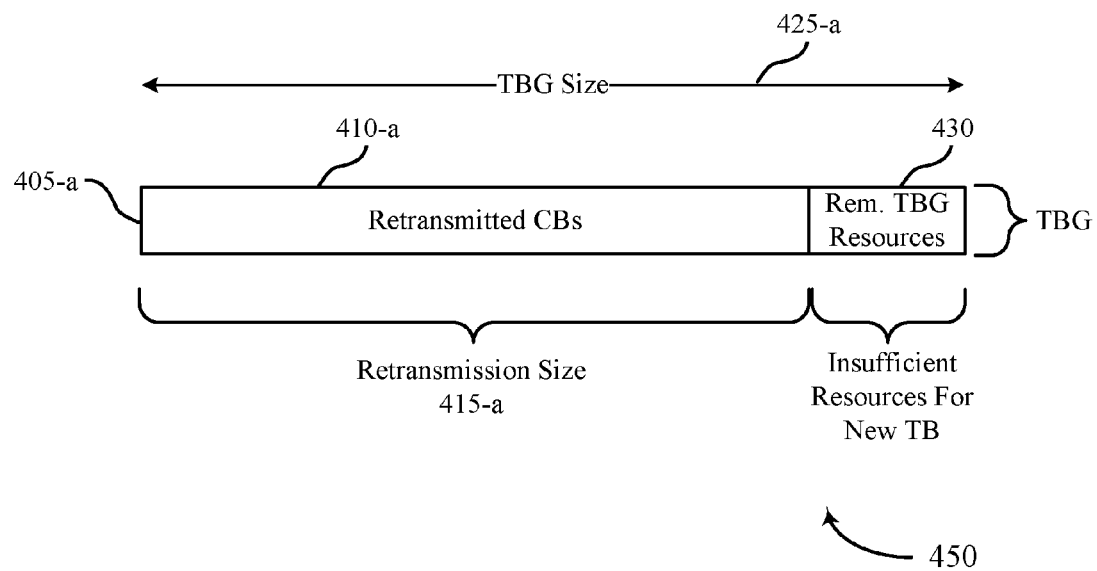

In other examples, a difference between a retransmission size and a TBG size may not be large enough to efficiently support transmission of a new TB in a TBG. FIG. 4B illustrates an example 450 of a TBG 405-a that may include retransmitted CBs 410-a that consume a retransmission size 415-a of TBG 405-a. In this example, retransmission size 415-a may occupy a substantial amount of TBG size 425-a, such that remaining TBG resources 430 may not be sufficient for efficient transmission of a new TB. In this example, even though TBG size 425-a is larger than retransmission size 415-a, the overhead related with a new TB transmission (e.g., CRC overhead, etc.) may not provide for efficient transmission of the new TB. As mentioned above, in some examples a threshold value may be provided for including a new TB in a TBG. Such a threshold value may be determined, in some examples, based on one or more of a CB size for code blocks to be retransmitted, a ratio of the TBG size and the retransmission size, or a modulation and coding scheme for the transmission.

Figure 5:
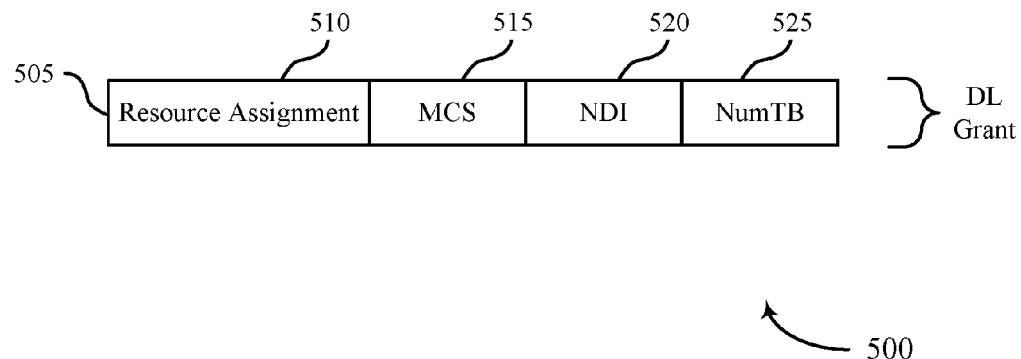
FIG. 5 illustrates an example of signaling information for a wireless resource grant that supports code block segmentation and rate matching for multiple transport block transmissions in accordance with various aspects of the present disclosure.

FIG. 5 illustrates an example of signaling information 500 that may be provided for code block segmentation and rate matching for multiple transport block transmissions in accordance with various aspects of the present disclosure. Signaling information 500 may include a DL grant 505 that, in some examples, may be transmitted to a UE 115 from a base station 105 described with reference to FIGS. 1-2. In this example, DL grant 505 may include a resource assignment 510, which may identify wireless resources (e.g., time resources, frequency resources, or combinations thereof) for a subsequent transmission. MCS field 515 may provide modulation and coding information for the transmission. NDI field 520 may provide an indication of whether the DL transmission will include a new TB or only retransmissions of one or more previously transmitted TBs. NumTB field 525 may include an indication of a number of prior TBs that may have CBs retransmitted in the DL transmission. In some examples, based on the DL grant 505, a UE may determine which CBs of one or more prior TBs are to be retransmitted, and a TBG size for the transmission. The UE also may determine if a new TB is to be transmitted, and may use such information to determine rate matching information for CB transmissions.

Figure 6:
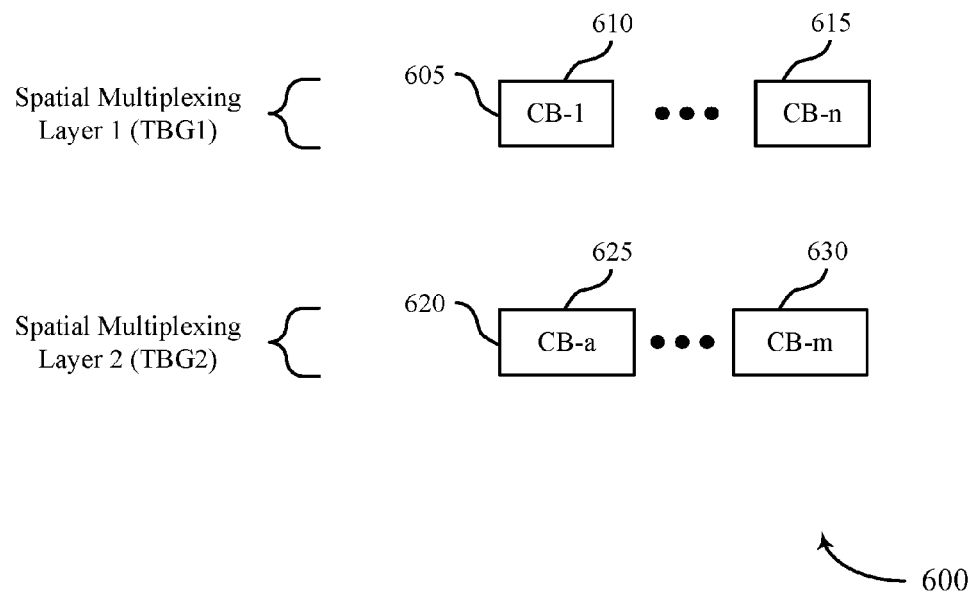
FIG. 6 illustrates an example of spatial multiplexing that supports code block segmentation and rate matching for multiple transport block transmissions in accordance with various aspects of the present disclosure.

FIG. 6 illustrates an example 600 of spatial multiplexing of transport block group transmissions that support code block segmentation and rate matching for multiple transport block transmissions in accordance with various aspects of the present disclosure. In the example 600 of FIG. 6, a UE and a base station, such as a UE 115 and base station 105 described with reference to FIGS. 1-2, may support rank two spatial multiplexing, which may allow for two concurrent code words to be transmitted between the UE and base station using multiple antennas of the base station and UE. In the example of FIG. 6, a first spatial multiplexing layer may be used to transmit a first transport block group TBG1 605, which may include CB-1 610 through CB-n 615. Likewise, a second spatial multiplexing layer may be used to transmit a first transport block group TBG1 620, which may include CB-a 625 through CB-m 630.

According to some examples, the MCS of TBG1 620 may be different than the MCS of TBG2, and for each layer a TBG size L(i) may be computed for layers i=0,1. For each spatial multiplexing layer, a retransmission size L'(i) may be computed, in a manner such as discussed above with respect to FIGS. 3, 4A, and 4B. A comparison of L(i) and L' may provide four combinations as indicated in Table 1:

TABLE 1

| | NDI = 1 | NDI = 0 |
|---|---|---|
| L(0) > L'(0), L(1) > L'(1) | New TB on layer 0 and layer 1 | No new TB. Rate match |
| L(0) > L'(0), L(1) ≤ L'(1) | New TB on layer 0 | |
| L(0) ≤ L'(0), L(1) > L'(1) | New TB on layer 1 | |
| L(0) ≤ L'(0), L(1) ≤ L'(1) | Not valid | |

In some examples, if L(i) is slightly larger than L'(i), the value of NDI may still be set to zero and no new TB transmitted on the layer. Instead, retransmission CBs may be retransmitted in the TBG, using rate matching to occupy available wireless resources.

In some examples, one spatial multiplexing layer may have a TBG size that is much larger than the associated retransmission size, while the other layer may have a TBG size that is only slightly larger than the retransmission size. For example, L(0) may be slightly larger than L' (0), but L(1) may be much larger than L'(1). Thus, a new TB may be transmitted in the first spatial multiplexing layer only. Such a new TB transmission may be indicated, in some examples, through a two-bit NDI indicator, which may map to the four different permutations for a new TB transmission. In other examples, a rule may be established such that if L(i)-L'(i) is smaller than certain threshold, a new TB will not be transmitted on the layer even if NDI indicates a new TB is to be transmitted. In some examples, the threshold may be based on a number of factors, such as, for example, the size of retransmission CBs, MCS, TBG size, or combinations thereof. In some examples, CB segmentation is performed for each spatial multiplexing layer, and a CB is not transmitted across two spatial multiplexing layers.

Figure 7A:
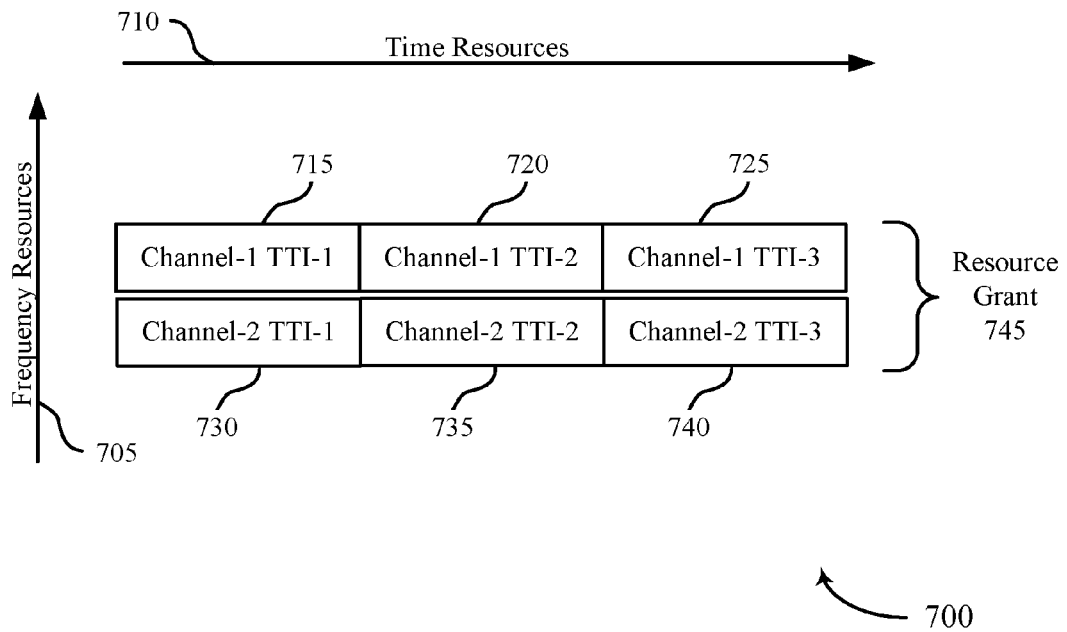
FIG. 7A illustrates an example of a resource grant of a shared radio frequency spectrum band including time resources and frequency resources that support code block segmentation and rate matching for multiple transport block transmissions in accordance with various aspects of the present disclosure.

FIG. 7A illustrates an example of uplink transmission resources 700 for code block segmentation and rate matching for multiple transport block transmissions in accordance with various aspects of the present disclosure. Uplink resources 700 may be used to transmit uplink communications from a UE to a base station, such as a UE 115 and base station 105 described with reference to FIGS. 1-2. The uplink resources 700 may be used to transmit TBGs that may contain CBs from multiple TBs, in manners similarly as described with respect to FIGS. 2-6. In the example of FIG. 7, an uplink grant 745 may identify both frequency resources 705, such as multiple wireless channels available for uplink communications, and time resources 710, such as multiple TTIs for uplink transmission. In the example of FIG. 7A, uplink resource grant 745 may include an allocation of channel 1 for TTI-1 715, an allocation of channel 1 for TTI-2 720, an allocation of channel 1 for TTI-3 725, an allocation of channel 2 for TTI-1 730, an allocation of channel 2 for TTI-2 735, and an allocation of channel 2 for TTI-3 740. When using a shared radio frequency spectrum band, a LBT procedure may be performed, such as a clear channel assessment (CCA), to confirm that the different resources 700 are available for uplink transmissions. In some cases, one or more of the resources 700 may not clear a CCA, and thus the UE may not be able to transmit using that particular resource.

Figure 7B:
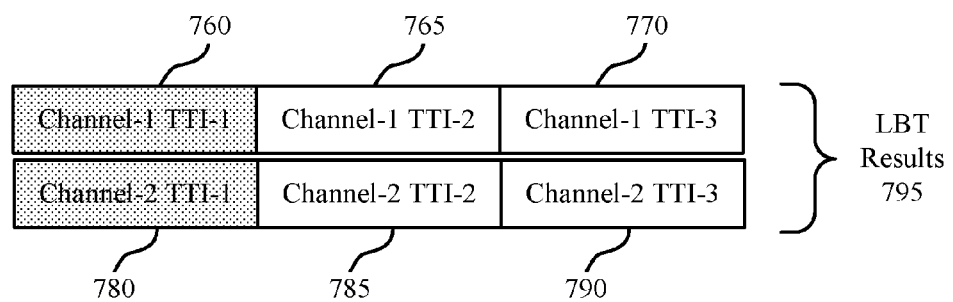
FIG. 7B illustrates an example of available shared radio frequency spectrum band resources of allocated resources that supports code block segmentation and rate matching for multiple transport block transmissions in accordance with various aspects of the present disclosure.

FIG. 7B illustrates an example of uplink transmission resources 750, a portion of which do not pass a LBT procedure, for code block segmentation and rate matching for multiple transport block transmissions in accordance with various aspects of the present disclosure. Uplink transmission resources 750 may be used to transmit uplink communications from a UE to a base station, such as a UE 115 and base station 105 described with reference to FIGS. 1-2. In the example of FIG. 7B, LBT results 795 provide that two resource allocations, namely channel-1 TTI-1 760 and channel-2 TTI-1 780, have an unsuccessful LBT procedure. The remaining resource allocations have a successful LBT procedure, namely channel-1 TTI-2 765, channel-1 TTI-3 770, channel-2 TTI-2 785, and channel-2 TTI-3 790. When resource allocation 745 of FIG. 7A is determined, TBG size and corresponding retransmission size and new TB transmission and size may be determined. However, when all or a portion of the allocated uplink resources are not available for transmission, such as illustrated in FIG. 7B, a UE may modify the uplink transmission based on the available uplink resources.

For example, in the illustrated scenario of FIG. 7B, a time domain resource limitation is encountered due to LBT (e.g., CCA) failure in TTI-1, and the UE only checked out the available channels in a later TTI. Thus, the UE can start transmitting when one or more of the channels passes the LBT procedure. The UE, in such examples, will still stop transmitting as scheduled in the uplink resource allocation 745. Similarly, a frequency domain resource limitation may be encountered where a LBT procedure may not pass for all of the frequency channels allocated to the UE. For example, uplink resource grant 745 may include interlaces on two 20 MHz channels, but a CCA may only pass on one channel. In such a case, the UE may transmit on the channel that cleared CCA. While the illustration of FIG. 7B indicates both time and frequency constraints for one TTI, the time and frequency constraints may happen independently of one another or may happen at the same time.

In situations where available uplink transmission resources are less than allocated uplink transmission resources, various examples provide for modification of TBG size and rate matching to accommodate the available uplink transmission resources. In a first set of examples, if it is determined that one or more allocated uplink transmission resources are not available for transmission, the UE may keep the TBG size from the original uplink resource grant and modify rate matching to split the reduced amount of coded bits across all available CBs. In a second set of examples, if it is determined that one or more allocated uplink transmission resources are not available for transmission, the UE may keep the TBG size and same rate matching from the original uplink resource grant, and sequentially cut-off CB transmissions at the end of the TBG. In a third set of examples, if it is determined that one or more allocated uplink transmission resources are not available for transmission, the UE may re-calculate TBG size given the actual available resources.

In the first set of examples, as mentioned, a UE may use rate matching to split available resources amongst the CBs to be transmitted. In such examples, the UE may use the TBG size computed with the nominal resource assigned, with no re-computation even though less resources are available than originally granted. Resources may be allocated proportionally to CB size for CBs of the TBG to split the remaining resources amongst the CBs. Such a technique may modify the uplink resources while maintaining the TBG and CBs allocated to the uplink resources without re-encoding information of the CBs. In the event that a significant amount of the allocated uplink resources do not clear the LBT procedure, the code rate may become relatively high, which may reduce the likelihood of successful receipt and decoding of the CBs at the base station. In such situations, retransmissions may be used convey the data of the CBs. In some examples, if a threshold amount of allocated uplink resources do not clear the LBT procedure (e.g., 40% or more), techniques of the first set of examples may not be used, or may be used in conjunction with other of the sets of examples.

In the second set of examples, as mentioned, a UE may keep the TBG size and same rate matching from the original uplink resource grant, and sequentially cut-off CB transmissions at the end of the TBG. Thus, such techniques essentially delay transmission of a portion of the TBG, and the TBG computation and rate matching both follow nominal grants. Once the actual uplink resource amount is determined, the UE may sequentially pack the coded bits into the available REs and drop the remaining coded bits after all available resources are used. Using such techniques, the un-transmitted coded bits are effectively treated as if the channel faded, and may rely on CB level retransmission to finish up the transmission. The base station may identify that the uplink resources used for the transmission were less than initially allocated, and may request an initial redundancy version (e.g., RVID=0) for the retransmission of the dropped CBs. Such techniques may provide relatively simple modifications to the uplink transmissions, without requiring re-encoding or re-rate matching.

In the third set of examples, as mentioned, a UE may re-calculate TBG size given the actual available resources. Such techniques may work with both time domain and frequency domain loss of allocated uplink resources. In some examples, if the initial value of NDI indicated that the original resource allocation could be used to transmit a new TB, but fewer uplink resources are actually available, the re-calculated TBG size $\hat{L}$ will be smaller than the initially calculated TBG size L'. In some examples, if $\hat{L} \leq L'$, a new TB may not be accommodated, and may simply be dropped. If $\hat{L} > L'$, a new TB can still be transmitted, but be smaller than the originally determined new TB size. In such cases, the UE may add a new TB of size $\hat{L}$-L' only, instead of L-L'. If L is only slightly larger than L, in some examples a threshold may be provided, and the UE may add new TB when $\hat{L}$-L' is larger than that threshold. In the event that the initial value of NDI indicated that the original resource allocation was not to be used to transmit a new TB, techniques described in the first set of examples, the second set of examples, or combinations thereof may be used.

Figure 8:
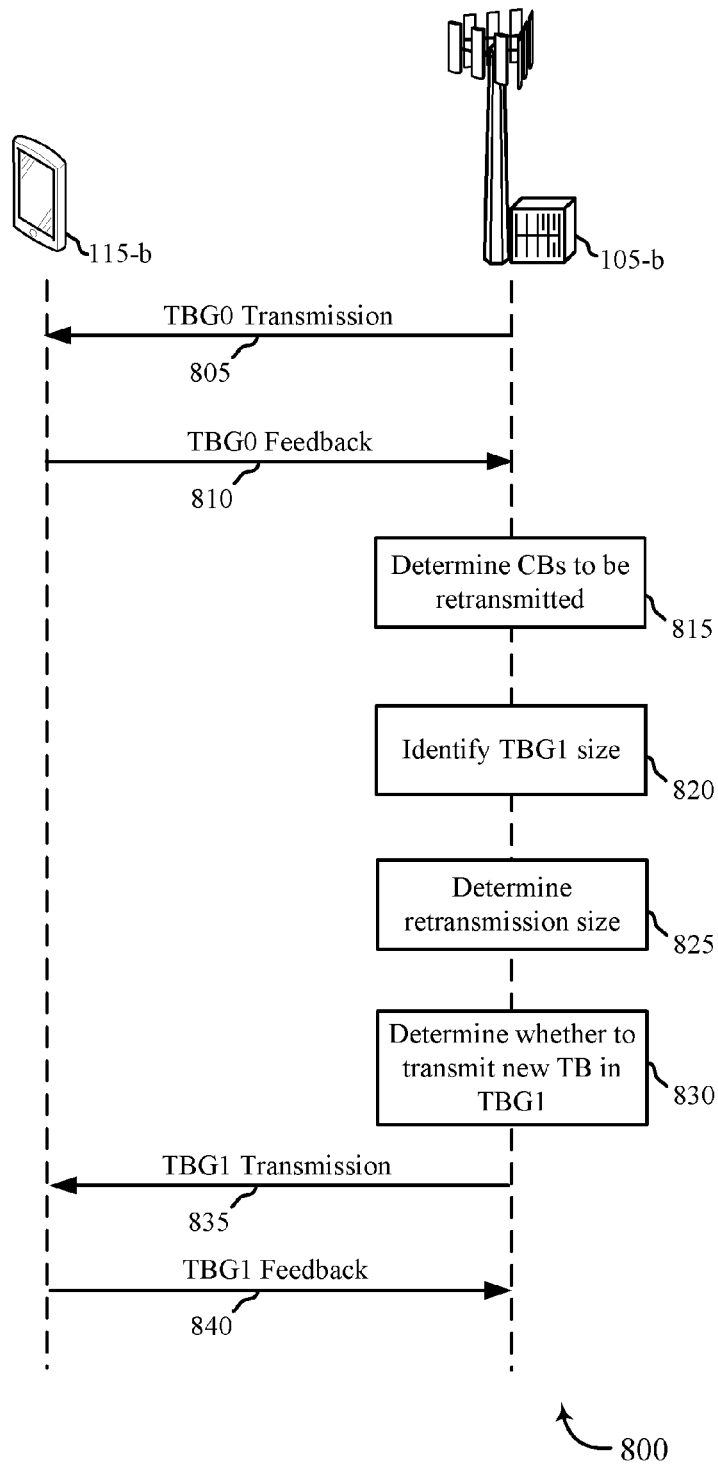
FIG. 8 illustrates an example of a process flow that supports code block segmentation and rate matching for multiple transport block transmissions in accordance with various aspects of the present disclosure.

FIG. 8 illustrates an example of a process flow 800 for code block segmentation and rate matching for multiple transport block transmissions in accordance with various aspects of the present disclosure. Process flow 800 may include a UE 115-*b* and base station 105-*b*, which may be examples of a UE 115 and base station 105 described with reference to FIGS. 1-2. In this example, the base station 105-*b* may transmit TBG0 805 to the UE 115-*b*, which may include CBs from one or more TBs such as discussed above. The UE 115-*b* may transmit TBG0 feedback 810 to the base station 105-*b* to indicate ACK/NACK for the transmitted CBs. The base station 105-*b* may then determine CBs that may be retransmitted, as indicated at block 815. Such a determination may include, as discussed above, a determination of a number of prior TBs that may have retransmissions and an identification of CBs that are to be retransmitted. The base station 105-*b* may then identify a transport block group size for a transmission of TBG1 to the UE 115-*b*, as indicated at block 820. At block 825, the base station 105-*b* may determine a retransmission size of the CBs to be retransmitted. The base station 105-*b*, at block 830, may determine whether to transmit a new TB to the UE 115-*b* in TBG1. Such a determination may be based on, as discussed above, one or more of the TBG size of TBG1 and the retransmission size. The base station 105-*b* may transmit TBG1 835 to the UE 115-*b*, and the UE 115-*b* may transmit TBG1 feedback 840 back to the base station 105-*b*, and the process may be repeated.

In some examples, as discussed above, the base station 105-*b* may transmit code blocks from two or more different transport blocks that are transmitted in the transport block group during the transmission of TBG0 or TBG1. In examples, the base station 105-*b* may determine to transmit the new TB to the UE 115-*b* when the TBG size of TBG1 exceeds the retransmission size. The size of the new TB may be based on a difference between the size of TBG1 and the retransmission size. The determination of the retransmission size, similarly as discussed above, may be made by aggregating CB sizes of the one or more CBs that are to be retransmitted. In some examples the determining that the one or more code blocks from the one or more prior transport blocks are to be retransmitted to the UE 115-*b* may include determining that a NACK is associated with the one or more CBs. In some examples the size of TBG1 is determined based on one or more of a number of resource blocks in wireless resources assigned for the transmission, a number of transmission time intervals in the wireless resources assigned for the transmission, a number of spatial multiplexing layers used for the transmission, or a modulation and coding scheme used for the transmission.

Also as discussed above, the base station 105-*b* in some examples may transmit an indication of whether the new TB is to be transmitted during the transmission. The indication also may include, in some examples, an identification of a number of consecutive prior TBs that may have CBs retransmitted during the transmission. The base station 105-*b* and the UE 115-*b* may each discard CBs to be retransmitted that are associated with TBs that are prior to the number of consecutive prior TBs that may have CBs retransmitted during the transmission. In certain examples, the base station 105-*b* may determine that a difference between the TBG size and the retransmission size supports including only the CBs of the one or more prior TBs to be retransmitted to the UE 115-*b* in the transmission.

Also as discussed above, the base station 105-*b* may determine a number of coded bits to be included in the transmission of TBG1 835. The base station 105-*b* may proportionally assign the number of coded bits to the CBs of the one or more prior TBs to be retransmitted to the UE 115-*b* in the transmission. In some examples the prior TBs include two or more prior TBs, and the CBs to be retransmitted for the prior TBs may have different CB sizes. Also as discussed above, the base station 105-*b* may divide the new TB into a set of CBs for the new TB. In some examples a size of the plurality of CBs for the new TB may be selected to provide uniform CB sizes for the new TB that occupy substantially all of the difference between the TBG size and the retransmission size. In some examples the determining that a difference between the TBG size and the retransmission size supports including the new TB in the transmission may include determining that the difference between the TBG size and the retransmission size exceeds a threshold value. In some examples the threshold value is determined based on one or more of a CB size for code blocks to be retransmitted, a ratio of the TBG size and the retransmission size, or a MCS for the transmission.

The base station 105-*b* also may determine a number of coded bits and a CB size of one or more CBs to be retransmitted to the UE 115-*b* and of one or more new CBs of the new TB to be transmitted to the UE 115-*b*. The base station 105-*b* may proportionally assign portions of the number of coded bits to each CB in proportion to the respective CB size. In some examples the number of coded bits are transmitted in a plurality of resource elements (REs), and the coded bits of each RE may be associated with a same CB (e.g., REs may not span different CBs).

In some examples the transmission to the UE 115-*b* is a spatially multiplexed transmission on two or more spatial multiplexing layers, and a MCS of each spatial multiplexing layer is determined independently of the MCS for other of the spatial multiplexing layers. The base station 105-*b* may identify the TBG size for each spatial multiplexing layer, and determine retransmission size of any CBs of one or more prior TBs to be retransmitted to the UE 115-*b* during the transmission for each spatial multiplexing layer. In examples where an indication is signaled to indicate a number of prior TBs that may have CBs retransmitted, or whether a new TB is included in a TBG, the indication may include a one-bit indicator, and a new TB may be transmitted on each spatial multiplexing layer that has a retransmission size that is less than the TBG size. In some examples the indication may be a multi-bit indicator that provides an indication of whether a new TB is transmitted on each spatial multiplexing layer. In further examples the indication may include a one-bit indicator, and a new TB may be transmitted on each spatial multiplexing layer in which the TBG size exceeds the retransmission size for the respective spatial multiplexing layer by at least a threshold value. As discussed above, CB retransmissions may remain in a same spatial multiplexing layer as original code block transmissions.

While a number of the examples discussed above are described with respect to a base station determining TBG size, and performing CB segmentation and rate marching, it is to be understood that such techniques may apply to a UE that is to transmit data to a base station using uplink resources. For example, in various examples, a UE may identify a TBG size for an UL transmission, may determine a retransmission size of any CBs of one or more prior TB s to be retransmitted to the base station during the transmission, and may determine whether to transmit a new TB to the base station during the transmission based on the TBG size and the retransmission size. The UE may also perform techniques as discussed above for dropping CBs of prior TBs, adding a new TB to a TBG, signaling an indication of NumTB and NDI, rate matching, segmentation, and spatial multiplexing.

Figure 9:
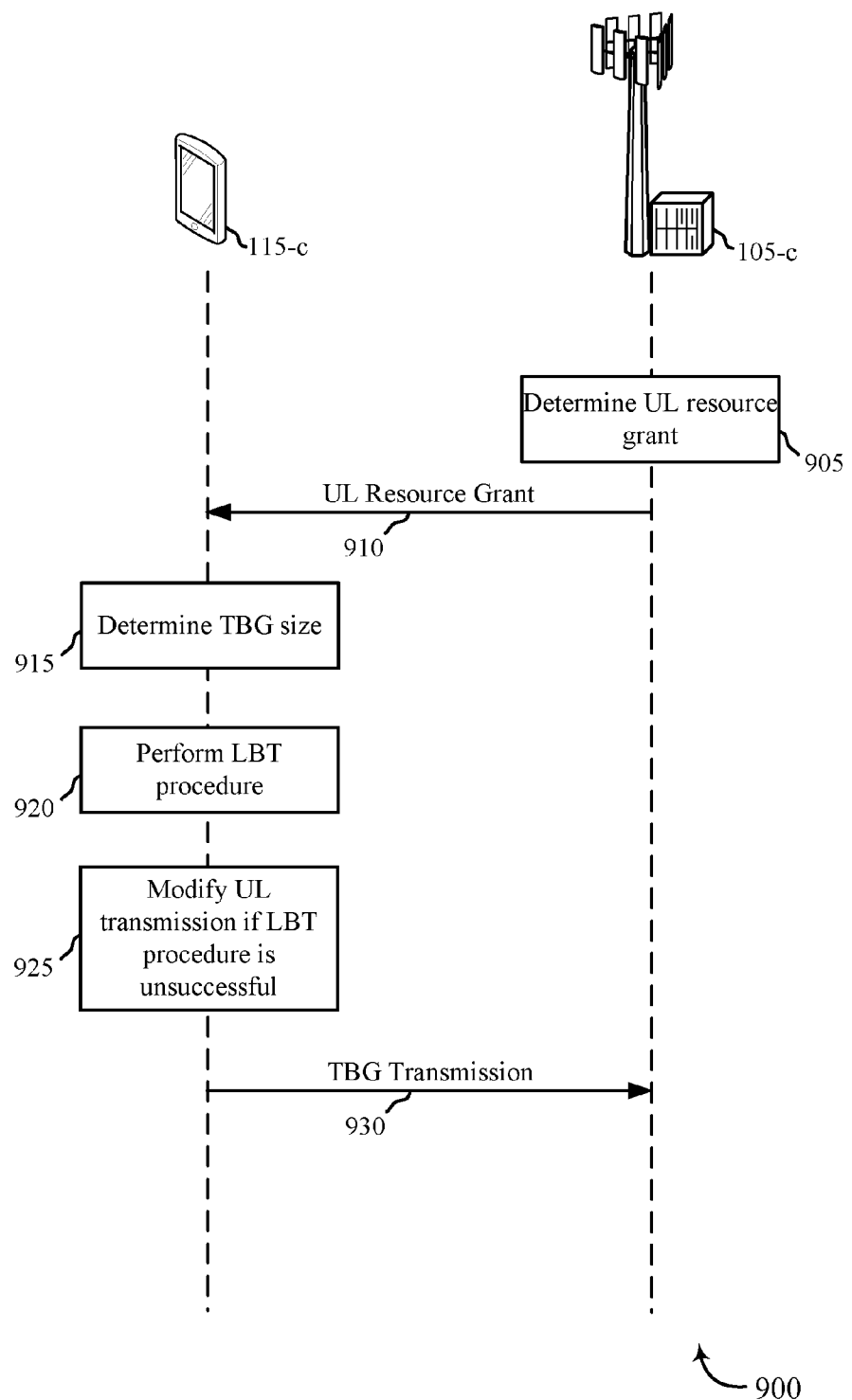
FIG. 9 illustrates another example of a process flow that supports code block segmentation and rate matching for multiple transport block transmissions in accordance with various aspects of the present disclosure.

FIG. 9 illustrates another example of a process flow 900 for code block segmentation and rate matching for multiple transport block transmissions in accordance with various aspects of the present disclosure. Process flow 900 may include a UE 115-c and base station 105-c, which may be examples of a UE 115 and base station 105 described with reference to FIG. 1-2 or 8.

Initially, at block 905, the base station 105-c determine an uplink (UL) resource grant for the UE 115-c to transmit uplink transmissions. The base station 105-c may transmit the UL resource grant 910 to the UE 115-c, which may identify uplink transmission resources for the uplink transmission. The UE 115-c may determine, based on the resource grant, a TBG size for a TBG to be transmitted in the uplink transmission, as indicated at block 915. The TBG may include a set of CBs from two or more TBs to be transmitted in the uplink transmission, similarly as discussed above. At block 920, the UE 115-c may perform a listen-before-talk (LBT) procedure for a wireless communication channel to be used for the uplink transmission to determine availability of the wireless communication channel for the uplink transmission resources. At block 925, the UE 115-c may modify the UL transmission if the LBT procedure is unsuccessful for one or more portions of the UL resource grant. In some examples, the UE 115-c may modify one or more of the TBG size, an encoding rate, or an amount of CBs for the uplink transmission based on the LBT procedure indicating the wireless communication channel may be unavailable for a portion of the UL transmission resources. The UE 115-c may then transmit the TBG transmission 930 to the base station 105-c. In some examples the CBs to be transmitted in the TBG may include at least a first CB from a first TB and a second CB from a second TB, and the CB sizes of the first CB and second CB may be different. In some examples the UL transmission resources may include two or more TTIs for the UL transmission, and the LBT procedure is performed for a first TTI. If the LBT procedure is successful for the resources of the first TTI, this may indicate that all of the UL resources of the UL grant will be usable for the UL transmission. If the LBT procedure is unsuccessful for the first TTI, the LBT procedure may be performed for a second TTI, and the amount of UL resources available may be determined based on the TTI where the LBT procedure is initially successful.

In some examples the UL transmission resources may include two or more frequency resources for the UL transmission, and the LBT procedure may be performed for each of the frequency resources. In such examples the modifying may be further performed based on the LBT procedure indicating the wireless communication channel is unavailable for one or more of the frequency resources for the UL transmission. The two or more frequency resources may include, for example, interlaces on two or more wireless communications channels.

The UE 115-c, in some examples, may modify a coding rate to support transmission of the set of CBs in the available resources. In some examples the coding rate is modified to allocate modulation symbols for the plurality of CBs based on a size of each respective CB. In some examples UE 115-c may identify a portion of the set of CBs to be transmitted in the available resources, may sequentially pack coded bits of the plurality of CBs into the available resources, and may drop remaining coded bits after all of the available resources are occupied. The UE 115-c, in other examples, may modify the TB group size based on the available resources, and may drop one or more of the CBs based on the modified TB group size. In some examples modifying the TB group size may be based on determining one or more of the CBs are to be dropped from the UL transmission. In some examples the set of CBs may include retransmission CBs from one or more prior TBs and new CBs from a new TB, and modifying the UL transmission may include regenerating one or more of the new CBs based on the modified TB group size.

Figure 10:
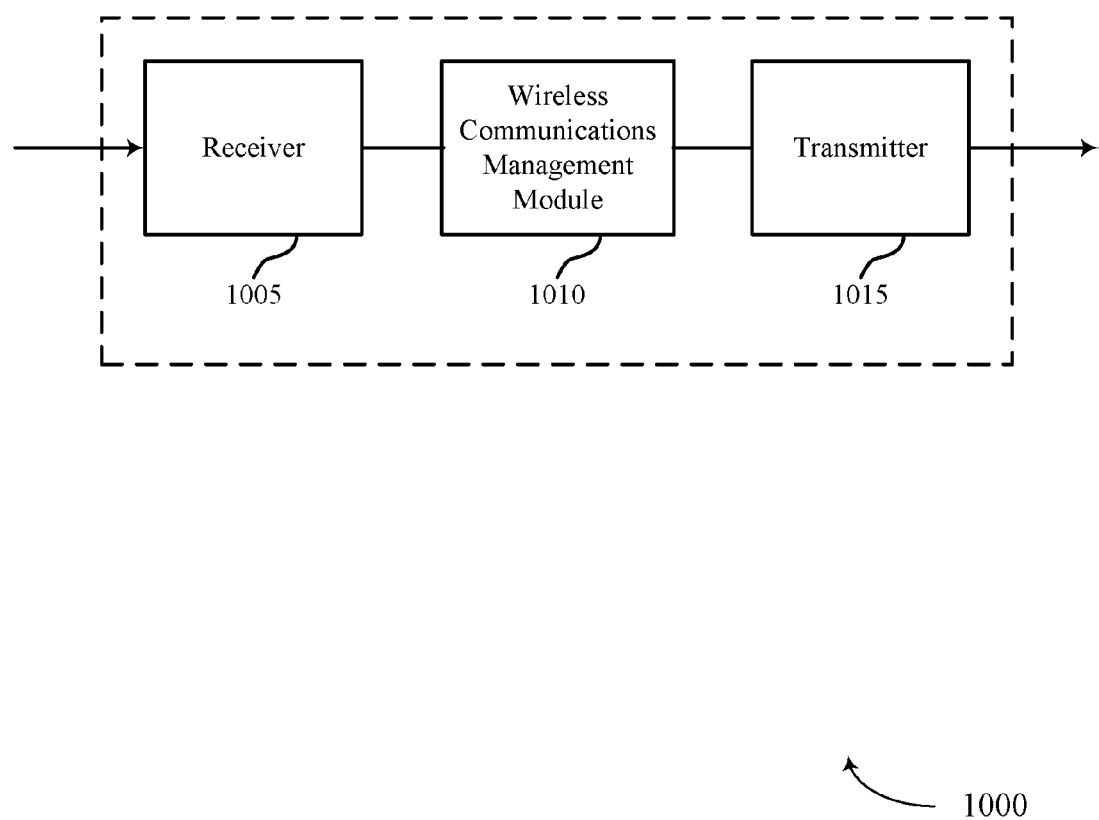
FIGS. 10-12 show block diagrams of a wireless device that supports code block segmentation and rate matching for multiple transport block transmissions in accordance with various aspects of the present disclosure.

FIG. 10 shows a block diagram of a wireless device 1000 configured for code block segmentation and rate matching for multiple transport block transmissions in accordance with various aspects of the present disclosure. Wireless device 1000 may be an example of aspects of a UE 115 described with reference to FIGS. 1-9. Wireless device 1000 may include a receiver 1005, a wireless communications management module 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to code block segmentation and rate matching for multiple transport block transmissions, etc.). Information may be passed on to the wireless communications management module 1010, and to other components of wireless device 1000.

The wireless communications management module 1010, in some examples, may identify a transport block group size for a transmission to a receiver, determine a retransmission size of any code blocks of one or more prior transport blocks to be retransmitted to the receiver during the transmission, and determine whether to transmit a new transport block to the receiver during the transmission based on the transport block group size and the retransmission size.

The wireless communications management module 1010, in further examples, may receive an UL resource grant that may identify uplink transmission resources for an uplink transmission, may determine, based on the resource grant, a TBG size for a TBG to be transmitted in the uplink transmission, may perform a LBT procedure for a wireless communication channel to be used for the uplink transmission, and may modify the UL transmission if the LBT procedure is unsuccessful for one or more portions of the UL resource grant. In some examples, the wireless communications management module 1010 may modify one or more of the TBG size, an encoding rate, or an amount of CBs for the uplink transmission.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
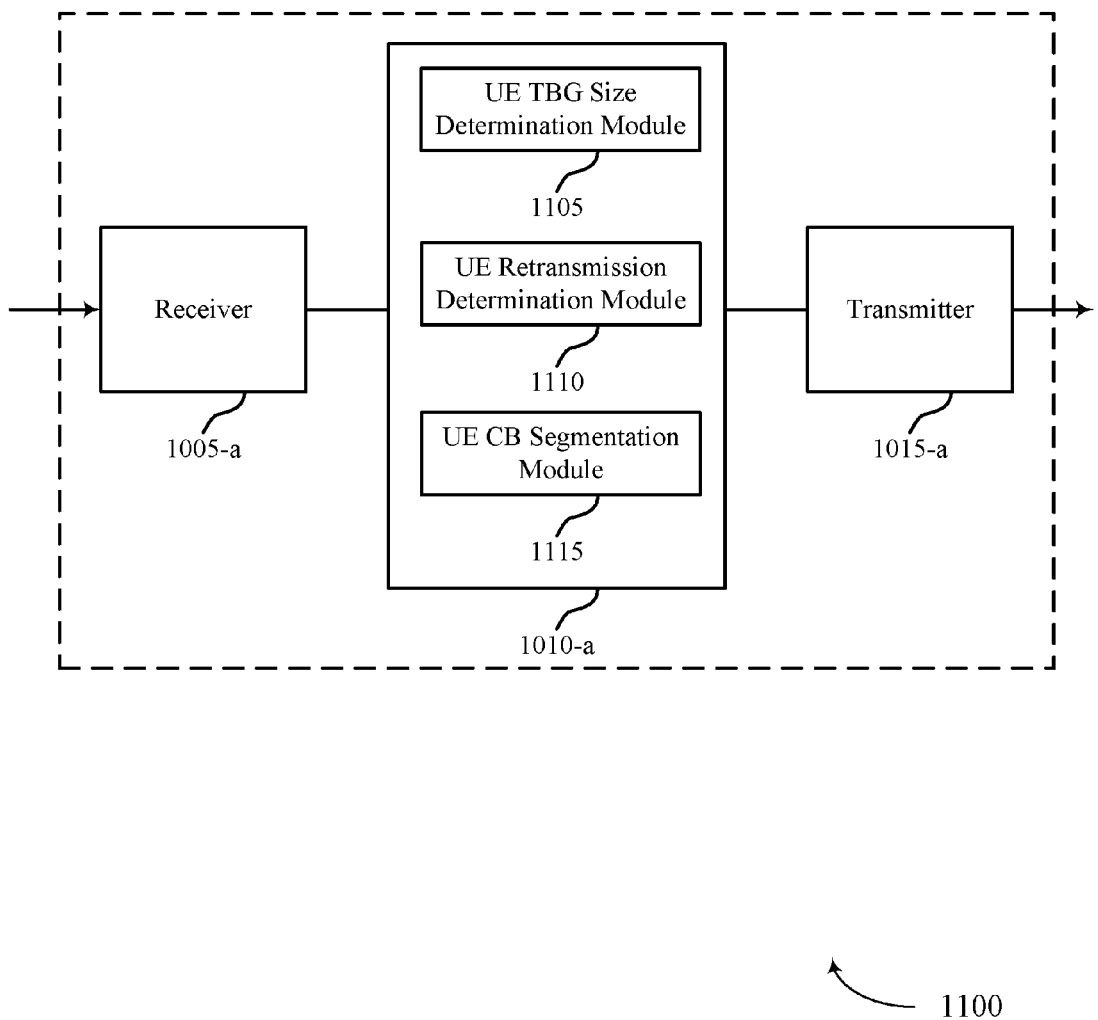

FIG. 11 shows a block diagram of a wireless device 1100 for code block segmentation and rate matching for multiple transport block transmissions in accordance with various aspects of the present disclosure. Wireless device 1100 may be an example of aspects of a wireless device 1000 or a UE 115 described with reference to FIGS. 1-10. Wireless device 1100 may include a receiver 1005-a, a wireless communications management module 1010-a, or a transmitter 1015-a. Wireless device 1100 may also include a processor. Each of these components may be in communication with each other. The wireless communications management module 1010-*a* may also include and a UE TBG size determination module 1105, a UE retransmission determination module 1110, a UE CB segmentation module 1115.

The UE TBG size determination module 1105 may identify a transport block group size for a transmission to a receiver as described with reference to FIGS. 2-9. In some examples, the transport block group size may be determined based on one or more of a number of resource blocks in wireless resources assigned for the transmission, a number of transmission time intervals in the wireless resources assigned for the transmission, a number of spatial multiplexing layers used for the transmission, or a modulation and coding scheme used for the transmission. The UE TBG size determination module 1105 may also determine a number of coded bits to be included in the transmission. In some examples, the prior transport blocks include two or more prior transport blocks, and the code blocks to be retransmitted for the prior transport blocks have different code block sizes. The UE TBG size determination module 1105 may also determine, based on the resource grant, a transport block group size for a transport block group to be transmitted in an uplink transmission, the transport block group including a plurality of code blocks from two or more transport blocks to be transmitted in the uplink transmission. In some examples, the plurality of code blocks comprise at least a first code block from a first transport block and a second code block from a second transport block, and the code block sizes of the first code block and second code block are different.

The UE retransmission determination module 1110 may determine a retransmission size of any code blocks of one or more prior transport blocks to be retransmitted to the receiver during the transmission as described with reference to FIGS. 2-9. In some examples, the determining the retransmission size may include determining that one or more code blocks from the one or more prior transport blocks transmitted to the receiver are to be retransmitted to the receiver. The UE retransmission determination module 1110 may also aggregate code block sizes of the one or more code blocks that are to be retransmitted. The UE retransmission determination module 1110 may also identify a number of consecutive prior transport blocks that may have code blocks retransmitted during the transmission, and may discard code blocks to be retransmitted that are associated with transport blocks prior to the number of consecutive prior transport blocks that may have code blocks retransmitted during the transmission. In some examples, the retransmission size may be determined based on a sum of code block sizes of code blocks to be retransmitted. The UE retransmission determination module 1110 may also determine that a difference between the transport block group size and the retransmission size supports including only the code blocks of the one or more prior transport blocks to be retransmitted to the receiver in the transmission. In some examples, identifying the number of consecutive prior transport blocks that may have code blocks retransmitted during the transmission may be based on a signaled indication of the number of consecutive prior transport blocks that may have code blocks retransmitted during the transmission.

The UE CB segmentation module 1115 may determine whether to transmit a new transport block to the receiver during the transmission based on the transport block group size and the retransmission size as described with reference to FIGS. 2-9. The UE CB segmentation module 1115 may also code blocks from two or more different transport blocks are transmitted in the transport block group during the transmission. In some examples, the UE CB segmentation module 1115 may also determine to transmit the new transport block to the receiver when the transport block group size exceeds the retransmission size. The UE CB segmentation module 1115 may also determine that a difference between the transport block group size and the retransmission size supports including the new transport block in the transmission. In some examples, a new transport block size of the new transport block may be determined based on a difference between the transport block group size and the retransmission size. In some examples, the determining that a difference between the transport block group size and the retransmission size supports including the new transport block in the transmission may be based on a determination that the difference between the transport block group size and the retransmission size exceeds a threshold value. In some examples, the threshold value may be determined based on one or more of a code block size for code blocks to be retransmitted, a ratio of the transport block group size and the retransmission size, or a modulation and coding scheme for the transmission.

The receiver 1005-*a* may receive information which may be passed on to wireless communications management module 1010-*a*, and to other components of wireless device 1100. The wireless communications management module 1010-*a* may perform the operations described with reference to FIG. 10. The transmitter 1015-*a* may transmit signals received from other components of wireless device 1100.

Figure 12:
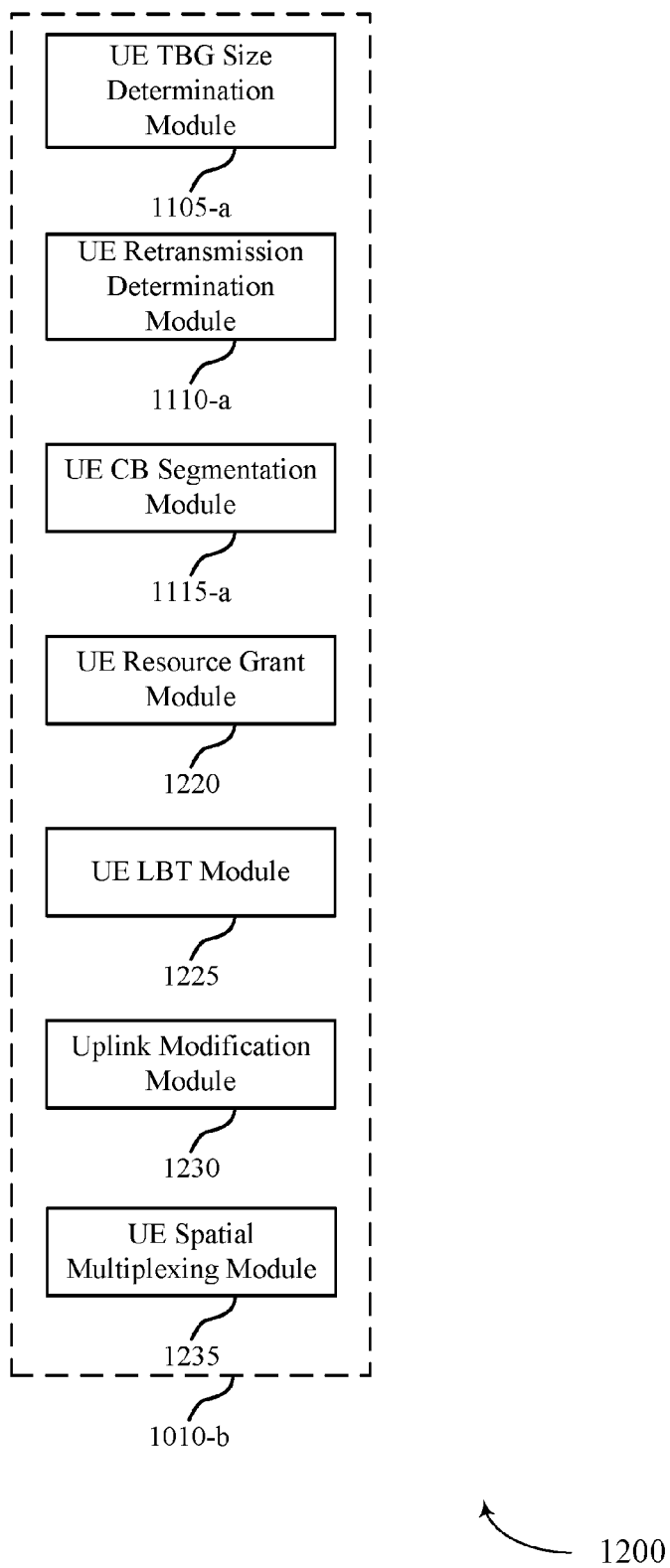

FIG. 12 shows a block diagram 1200 of a wireless communications management module 1010-*b* which may be a component of a wireless device 1000 or a wireless device 1100 for code block segmentation and rate matching for multiple transport block transmissions in accordance with various aspects of the present disclosure. The wireless communications management module 1010-*b* may be an example of aspects of a wireless communications management module 1010 described with reference to FIGS. 10-11. The wireless communications management module 1010-*b* may include and a Default 1105-*a*. Each of these modules may perform the functions described with reference to FIG. 11. The wireless communications management module 1010-*b* may include a UE TBG size module 1105-*a*, a UE retransmission determination module 1110-*a*, a UE CB segmentation module 1115-*a*. The wireless communications management module 1010-*b* may also include, a UE resource grant module 1220, a UE LBT module 1225, an uplink modification module 1230, and a UE spatial multiplexing module 1235.

The UE resource grant module 1220 may receive a resource grant for an uplink transmission, the resource grant identifying uplink transmission resources for the uplink transmission as described with reference to FIGS. 2-9. In some examples, the UL transmission resources may include two or more frequency resources that may include interlaces on two or more wireless communications channels, two or more time resources, or combinations thereof.

The UE LBT module 1225 may perform a listen-before-talk (LBT) procedure for a wireless communication channel to be used for the uplink transmission to determine availability of the wireless communication channel for the uplink transmission resources as described with reference to FIGS. 2-9. In some examples, the uplink transmission resources may include two or more transmission time intervals (TTIs) for the uplink transmission, the LBT procedure may be performed for a first TTI, and the LBT procedure may be performed for a second TTI when the LBT procedure for the first TTI is unsuccessful. In examples where the uplink transmission resources comprise two or more frequency resources for the uplink transmission, the LBT procedure may be performed for the frequency resources.

The uplink modification module 1230 may modify one or more of the transport block group size, an encoding rate, or an amount of code blocks for the uplink transmission based on the LBT procedure indicating the wireless communication channel is unavailable for a portion of the uplink transmission resources as described with reference to FIGS. 2-9. In some examples, the modifying may be further performed based on the unsuccessful LBT procedure for a first TTI. In some examples, the modifying may be further performed based on the LBT procedure indicating the wireless communication channel may be unavailable for one or more frequency resources for the uplink transmission. In some examples, the modifying may include determining available resources for the uplink transmission, and modifying a coding rate to support transmission of the plurality of code blocks in the available resources. In some examples, the modifying may include determining available resources for the uplink transmission, and identifying a portion of the plurality of code blocks to be transmitted in the available resources. In some examples, the portion of the code blocks to be transmitted in the available resources may be sequentially packed as coded bits into the available resources. The uplink modification module 1230 may also drop remaining coded bits after all of the available resources are occupied. In some examples, the modifying may include determining available resources for the uplink transmission and modifying the transport block group size based on the available resources. The uplink modification module 1230 may also drop one or more of the code blocks based on the modified transport block group size. In some examples, the plurality of code blocks comprise retransmission code blocks from one or more prior transport blocks and new code blocks from a new transport block, and one or more of the new code blocks may be regenerated based on the modified transport block group size.

The spatial multiplexing module 1225 may be configured such that the transmission to the receiver may be a spatially multiplexed transmission on two or more spatial multiplexing layers, and wherein a modulation and coding scheme (MCS) of each spatial multiplexing layer may be determined independently of the MCS for other of the spatial multiplexing layers as described with reference to FIGS. 2-9. The spatial multiplexing module 1225 may also identify the transport block group size for each spatial multiplexing layer. In some examples, determining the retransmission size may include determining the retransmission size of any code blocks of one or more prior transport blocks to be retransmitted to the receiver during the transmission for each spatial multiplexing layer. Code block retransmissions may remain in a same spatial multiplexing layer as original code block transmissions, according to various examples.

Figure 13:
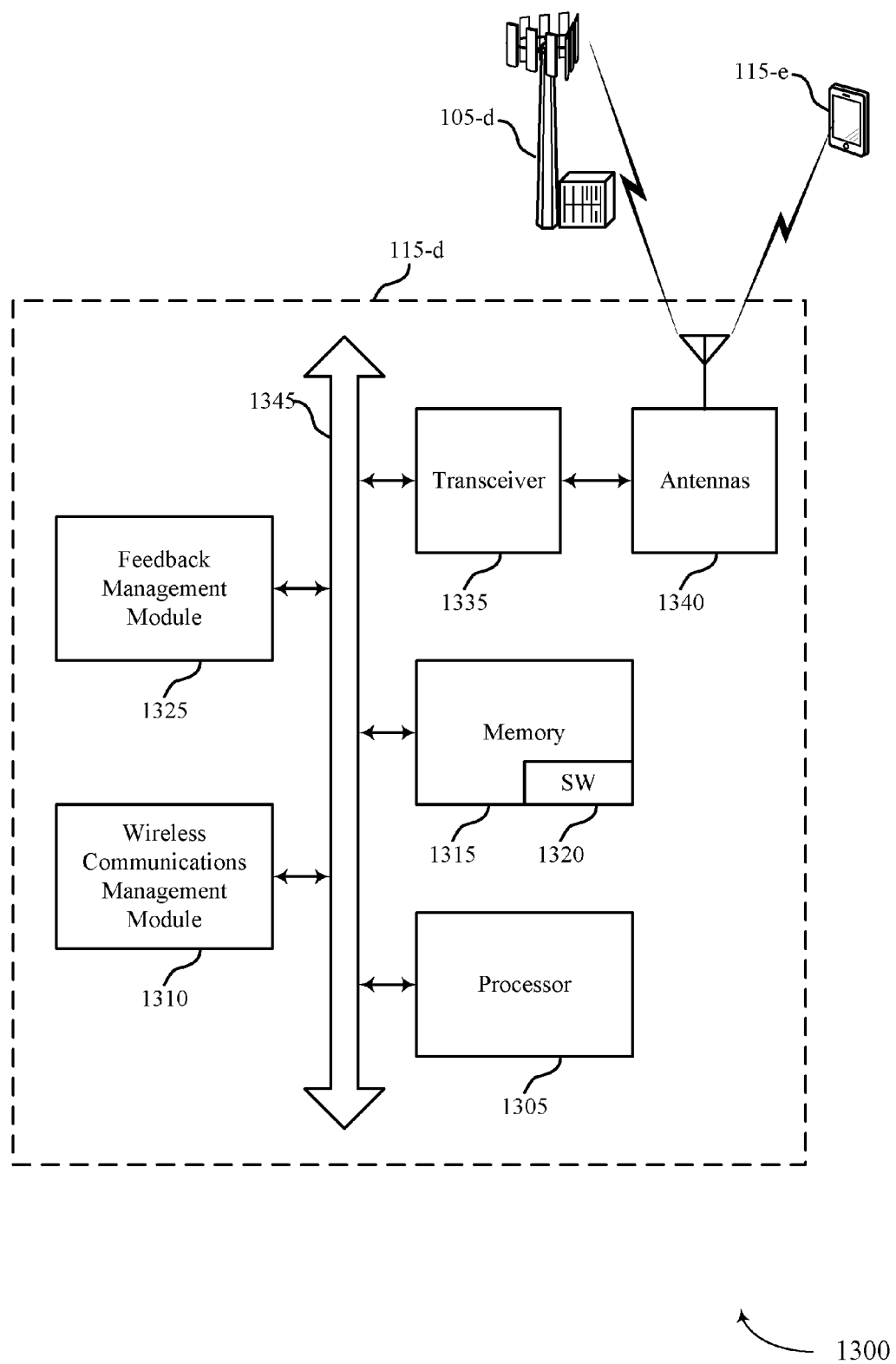
FIG. 13 illustrates a block diagram of a system including a user equipment (UE) that supports code block segmentation and rate matching for multiple transport block transmissions in accordance with various aspects of the present disclosure.

FIG. 13 shows a diagram of a system 1300 including a UE 115 configured for code block segmentation and rate matching for multiple transport block transmissions in accordance with various aspects of the present disclosure. System 1300 may include UE 115-*d*, which may be an example of a wireless device 1000, a wireless device 1100, or a UE 115 described with reference to FIGS. 1, 2 and 10-12. UE 115-*d* may include a wireless communications management module 1310, which may be an example of a wireless communications management module 1010 described with reference to FIGS. 10-12. UE 115-*d* may also include a feedback management module 1325, which may perform feedback functions such as HARQ ACK/NACK feedback as discussed above with respect to FIGS. 1-9. UE 115-*d* may also include components for bi-directional voice and data communications including components for transmitting communications and components for receiving communications. For example, UE 115-*d* may communicate bi-directionally with base station 105-*d* or UE 115-*e*.

UE 115-*d* may also include a processor 1305, and memory 1315 (including software (SW)) 1320, a transceiver 1335, and one or more antenna(s) 1340, each of which may communicate, directly or indirectly, with one another (e.g., via buses 1345). The transceiver 1335 may communicate bi-directionally, via the antenna(s) 1340 or wired or wireless links, with one or more networks, as described above. For example, the transceiver 1335 may communicate bi-directionally with a base station 105 or another UE 115. The transceiver 1335 may include a modem to modulate the packets and provide the modulated packets to the antenna(s) 1340 for transmission, and to demodulate packets received from the antenna(s) 1340. While UE 115-*d* may include a single antenna 1340, UE 115-*d* may also have multiple antennas 1340 capable of concurrently transmitting or receiving multiple wireless transmissions.

The memory 1315 may include random access memory (RAM) and read only memory (ROM). The memory 1315 may store computer-readable, computer-executable software/firmware code 1320 including instructions that, when executed, cause the processor 1305 to perform various functions described herein (e.g., code block segmentation and rate matching for multiple transport block transmissions, etc.). Alternatively, the software/firmware code 1320 may not be directly executable by the processor 1305 but cause a computer (e.g., when compiled and executed) to perform functions described herein. The processor 1305 may include an intelligent hardware device, (e.g., a central processing unit (CPU), a microcontroller, an application specific integrated circuit (ASIC), etc.)

Figure 14:
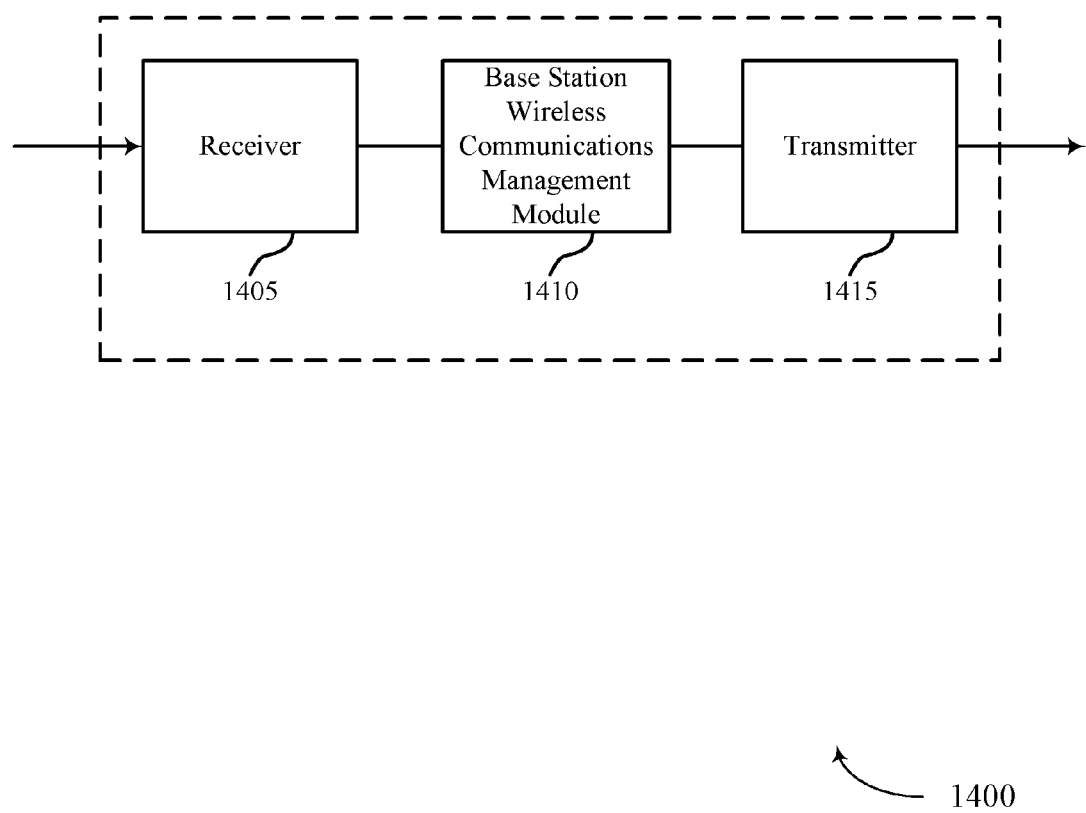
FIGS. 14-16 show block diagrams of a wireless device that supports code block segmentation and rate matching for multiple transport block transmissions in accordance with various aspects of the present disclosure.

FIG. 14 shows a block diagram of a wireless device 1400 configured for code block segmentation and rate matching for multiple transport block transmissions in accordance with various aspects of the present disclosure. Wireless device 1400 may be an example of aspects of a base station 105 described with reference to FIGS. 1-13. Wireless device 1400 may include a receiver 1405, a base station wireless communications management module 1410, or a transmitter 1415. Wireless device 1400 may also include a processor. Each of these components may be in communication with each other.

The receiver 1405 may receive information such as packets, user data, or control information associated with various information channels (e.g., control channels, data channels, and information related to code block segmentation and rate matching for multiple transport block transmissions, etc.). Information may be passed on to the base station wireless communications management module 1410, and to other components of wireless device 1400.

The base station wireless communications management module 1410 may identify a transport block group size for a transmission, receive an indication of whether code blocks from two or more transport blocks are to be included in the transmission, and determine a code block size for code blocks from the two or more transport blocks based on the transport block group size and the indication.

The transmitter 1415 may transmit signals received from other components of wireless device 1400. In some examples, the transmitter 1415 may be collocated with the receiver 1405 in a transceiver module. The transmitter 1415 may include a single antenna, or it may include a plurality of antennas.

Figure 15:
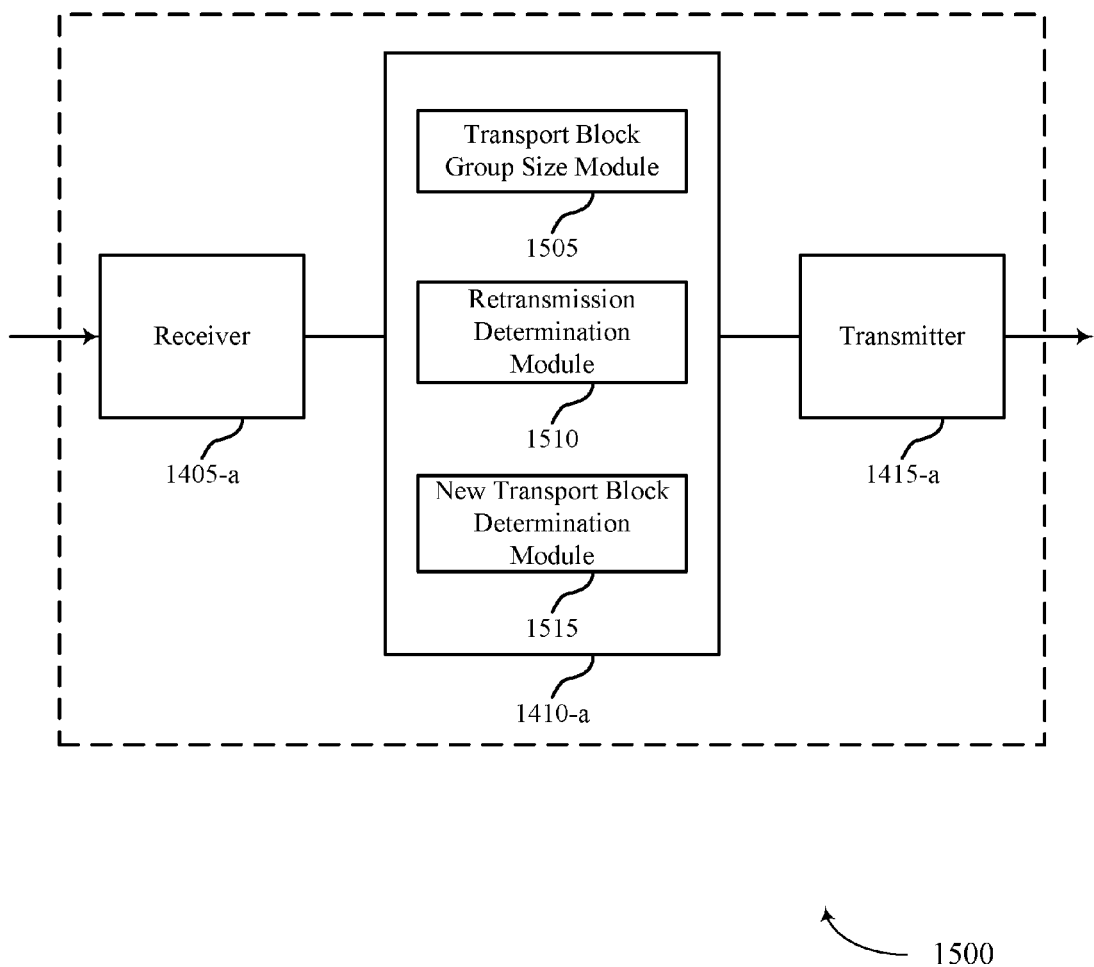

FIG. 15 shows a block diagram of a wireless device 1500 for code block segmentation and rate matching for multiple transport block transmissions in accordance with various aspects of the present disclosure. Wireless device 1500 may be an example of aspects of a wireless device 1400 or a base station 105 described with reference to FIGS. 1-14. Wireless device 1500 may include a receiver 1405-a, a base station wireless communications management module 1410-a, or a transmitter 1415-a. Wireless device 1500 may also include a processor. Each of these components may be in communication with each other. The base station wireless communications management module 1410-a may also include a transport block group size module 1505, a retransmission determination module 1510, a new transport block determination module 1515.

The receiver 1405-a may receive information which may be passed on to base station wireless communications management module 1410-a, and to other components of wireless device 1500. The base station wireless communications management module 1410-a may perform the operations described with reference to FIG. 14. The transmitter 1415-a may transmit signals received from other components of wireless device 1500.

The transport block group size module 1505 may identify a transport block group size for a transmission to a receiver as described with reference to FIGS. 2-9. In some examples, the transport block group size may determine based on one or more of a number of resource blocks in wireless resources assigned for the transmission, a number of transmission time intervals in the wireless resources assigned for the transmission, a number of spatial multiplexing layers used for the transmission, or a modulation and coding scheme used for the transmission. The transport block group size module 1505 may also determine a number of coded bits to be included in the transmission. In some examples, the prior transport blocks include two or more prior transport blocks, and the code blocks to be retransmitted for the prior transport blocks may have different code block sizes.

The retransmission determination module 1510 may determine a retransmission size of any code blocks of one or more prior transport blocks to be retransmitted to the receiver during the transmission as described with reference to FIGS. 2-9. In some examples, determining the retransmission size may include determining that one or more code blocks from the one or more prior transport blocks transmitted to the receiver are to be retransmitted to the receiver. The retransmission determination module 1510 may also aggregate code block sizes of the one or more code blocks that are to be retransmitted. The retransmission determination module 1510 may also identify a number of consecutive prior transport blocks that may have code blocks retransmitted during the transmission, and may discard code blocks to be retransmitted that are associated with transport blocks prior to the number of consecutive prior transport blocks that may have code blocks retransmitted during the transmission. In some examples, the retransmission size may be determined based on a sum of code block sizes of code blocks to be retransmitted. The retransmission determination module 1510 may, in some examples, determine that a difference between the transport block group size and the retransmission size supports including only the code blocks of the one or more prior transport blocks to be retransmitted to the receiver in the transmission. The retransmission determination module 1510 may also receive, in some examples, an indication of whether code blocks from two or more transport blocks are to be included in the transmission.

The new transport block determination module 1515 may determine whether to transmit a new transport block to the receiver during the transmission based on the transport block group size and the retransmission size as described with reference to FIGS. 2-9. The new transport block determination module 1515 may, in some examples, determine to transmit the new transport block to the receiver when the transport block group size exceeds the retransmission size. The new transport block determination module 1515 may determine a size of the new transport block based on a difference between the transport block group size and the retransmission size. The new transport block determination module 1515 may also determine that a difference between the transport block group size and the retransmission size supports including the new transport block in the transmission. In some examples, the determining that a difference between the transport block group size and the retransmission size supports including the new transport block in the transmission may include determining that the difference between the transport block group size and the retransmission size exceeds a threshold value. In some examples, the threshold value may be determined based on one or more of a code block size for code blocks to be retransmitted, a ratio of the transport block group size and the retransmission size, or a modulation and coding scheme for the transmission.

Figure 16:
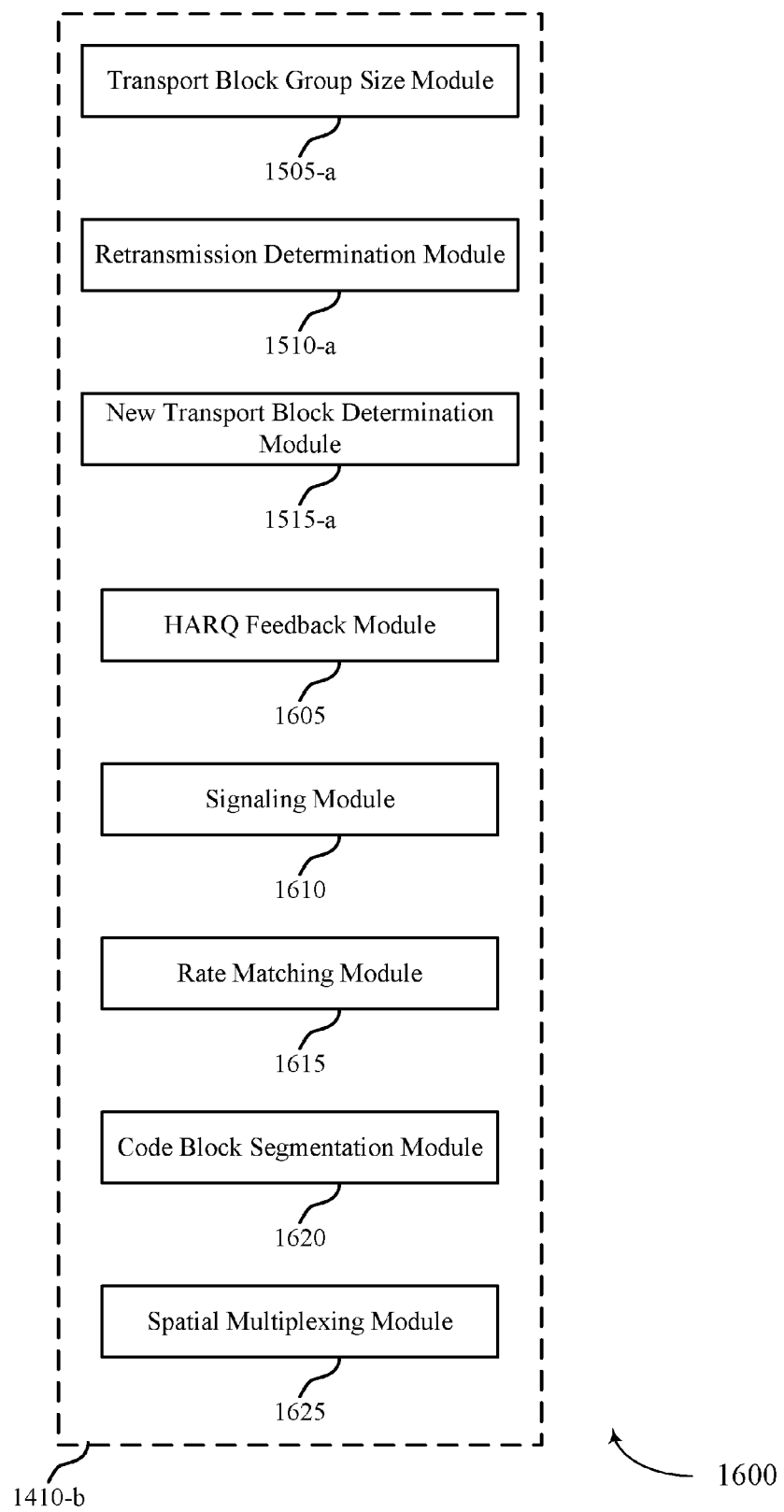

FIG. 16 shows a block diagram 1600 of a base station wireless communications management module 1410-b which may be a component of a wireless device 1400 or a wireless device 1500 for code block segmentation and rate matching for multiple transport block transmissions in accordance with various aspects of the present disclosure. The base station wireless communications management module 1410-b may be an example of aspects of a base station wireless communications management module 1410 described with reference to FIGS. 14-15. The base station wireless communications management module 1410-b may include a transport block group size module 1505-a, a retransmission determination module 1510-a, and a new transport block determination module 1515-a. Each of these modules may perform the functions described with reference to FIG. 15. The base station wireless communications management module 1410-b may also include a HARQ feedback module 1605, a signaling module 1610, a rate matching module 1615, a code block segmentation module 1620, and a spatial multiplexing module 1625.

The HARQ feedback module 1605 may be configured to determine that the one or more code blocks from the one or more prior transport blocks are to be retransmitted to the receiver through determining that a negative acknowledgment (NACK) may be associated with the one or more code blocks, as described with reference to FIGS. 2-9.

The signaling module 1610 may transmit an indication of whether the new transport block is to be transmitted during the transmission as described with reference to FIGS. 2-9. The signaling module 1610 may also transmit an indication of the number of consecutive prior transport blocks that may have code blocks retransmitted during the transmission. In some examples, transmissions may be made using multiple spatial multiplexing layers, and the indication that a new transport block is to be transmitted may include a one-bit indicator, and a new transport block may be transmitted one or more spatial multiplexing layers that have a retransmission size that may be less than the transport block group size. In some examples, the indication that a new transport block is to be transmitted may include a multi-bit indicator that provides an indication of whether a new transport block may be transmitted on each of multiple spatial multiplexing layers. In some examples, the indication that a new transport block is to be transmitted may include a one-bit indicator, and a new transport block may be transmitted on each spatial multiplexing layer in which the transport block group size exceeds the retransmission size for the respective spatial multiplexing layer by at least a threshold value.

The rate matching module 1615 may proportionally assign the number of coded bits to the code blocks of the one or more new or prior transport blocks to be transmitted to the receiver in the transmission as described with reference to FIGS. 2-9. The rate matching module 1615 may also proportionally assign portions of the number of coded bits to each code block in proportion to the respective code block size.

The code block segmentation module 1620 may divide a new transport block into a plurality of code blocks for the new transport block as described with reference to FIGS. 2-9. In some examples, a size of the plurality of code blocks for the new transport block may be selected to provide uniform code block sizes for the new transport block that occupy substantially all of the difference between the transport block group size and the retransmission size. The code block segmentation module 1620 may also determine a number of coded bits to be included in the transmission, and may determine a code block size of one or more code blocks to be retransmitted to the receiver and of one or more new code blocks of the new transport block to be transmitted to the receiver. In some examples, the number of coded bits are transmitted in a plurality of resource elements, and coded bits of each resource element may be associated with a same code block.

The spatial multiplexing module 1625 may be configured such that the transmission to the receiver may be a spatially multiplexed transmission on two or more spatial multiplexing layers, and a modulation and coding scheme (MCS) of each spatial multiplexing layer may be determined independently of the MCS for other of the spatial multiplexing layers as described with reference to FIGS. 2-9. The spatial multiplexing module 1625 may also identify the transport block group size for each spatial multiplexing layer and determine the retransmission size of any code blocks of one or more prior transport blocks to be retransmitted to the receiver during the transmission for each spatial multiplexing layer. Code block retransmissions may remain in a same spatial multiplexing layer as original code block transmissions according to various examples.

Figure 17:
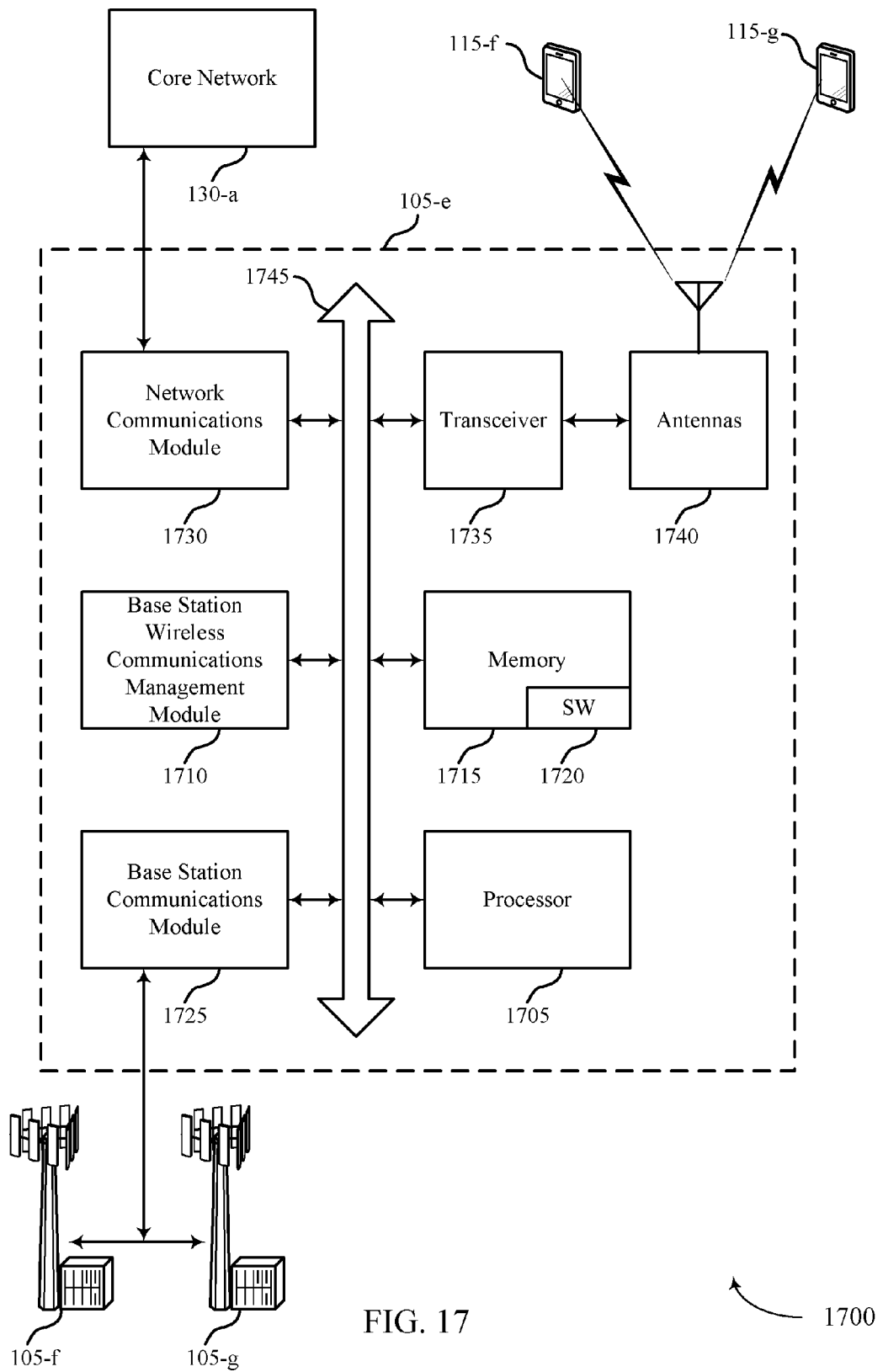
FIG. 17 illustrates a block diagram of a system including a base station that supports code block segmentation and rate matching for multiple transport block transmissions in accordance with various aspects of the present disclosure.

FIG. 17 shows a diagram of a system 1700 including a base station 105 configured for code block segmentation and rate matching for multiple transport block transmissions in accordance with various aspects of the present disclosure. System 1700 may include base station 105-e, which may be an example of a wireless device 1400, a wireless device 1500, or a base station 105 described with reference to FIGS. 1, 2 and 14-16. Base Station 105-e may include a base station wireless communications management module 1710, which may be an example of a base station wireless communications management module 1410 described with reference to FIGS. 14-16. Base Station 105-e may also include components for bi-directional voice and data communications including components for transmitting communications and components for receiving communications. For example, base station 105-e may communicate bi-directionally with UE 115- for UE 115-g.

In some cases, base station 105-e may have one or more wired backhaul links. Base station 105-e may have a wired backhaul link (e.g., S1 interface, etc.) to the core network 130. Base station 105-e may also communicate with other base stations 105, such as base station 105-f and base station 105-g via inter-base station backhaul links (e.g., an X2 interface). Each of the base stations 105 may communicate with UEs 115 using the same or different wireless communications technologies. In some cases, base station 105-e may communicate with other base stations such as 105- for 105-g utilizing base station communication module 1725. In some examples, base station communication module 1725 may provide an X2 interface within a Long Term Evolution (LTE)/LTE-A wireless communication network technology to provide communication between some of the base stations 105. In some examples, base station 105-e may communicate with other base stations through core network 130. In some cases, base station 105-e may communicate with the core network 130 through network communications module 1730.

The base station 105-e may include a processor 1705, memory 1715 (including software (SW)1720), transceiver 1735, and antenna(s) 1740, which each may be in communication, directly or indirectly, with one another (e.g., over bus system 1745). The transceivers 1735 may be configured to communicate bi-directionally, via the antenna(s) 1740, with the UEs 115, which may be multi-mode devices. The transceiver 1735 (or other components of the base station 105-e) may also be configured to communicate bi-directionally, via the antennas 1740, with one or more other base stations (not shown). The transceiver 1735 may include a modem configured to modulate the packets and provide the modulated packets to the antennas 1740 for transmission, and to demodulate packets received from the antennas 1740. The base station 105-e may include multiple transceivers 1735, each with one or more associated antennas 1740. The transceiver may be an example of a combined receiver 1405 and transmitter 1415 of FIG. 14.

The memory 1715 may include RAM and ROM. The memory 1715 may also store computer-readable, computer-executable software code 1720 containing instructions that are configured to, when executed, cause the processor 1710 to perform various functions described herein (e.g., code block segmentation and rate matching for multiple transport block transmissions, selecting coverage enhancement techniques, call processing, database management, message routing, etc.). Alternatively, the software 1720 may not be directly executable by the processor 1705 but be configured to cause the computer, e.g., when compiled and executed, to perform functions described herein. The processor 1705 may include an intelligent hardware device, e.g., a CPU, a microcontroller, an ASIC, etc. The processor 1705 may include various special purpose processors such as encoders, queue processing modules, base band processors, radio head controllers, digital signal processor (DSPs), and the like.

The base station communications module 1725 may manage communications with other base stations 105. In some cases, a communications management module may include a controller or scheduler for controlling communications with UEs 115 in cooperation with other base stations 105. For example, the base station communications module 1725 may coordinate scheduling for transmissions to UEs 115 for various interference mitigation techniques such as beamforming or joint transmission.

The components of wireless device 1000, wireless device 1100, and wireless communications management module 1010, wireless device 1400, wireless device 1500, and base station wireless communications management module 1410 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 18:
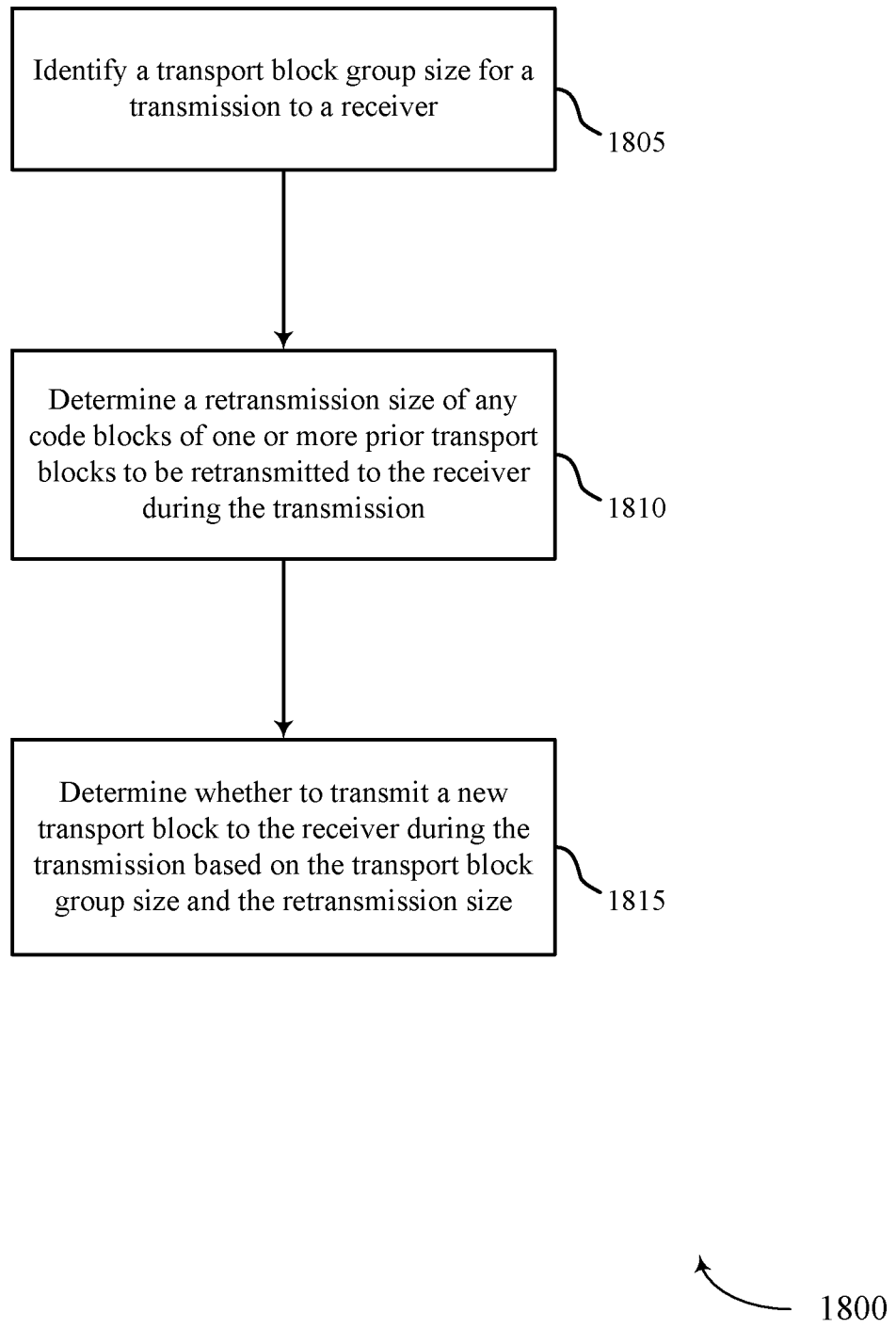
FIGS. 18-23 illustrate methods for code block segmentation and rate matching for multiple transport block transmissions in accordance with various aspects of the present disclosure.

FIG. 18 shows a flowchart illustrating a method 1800 for code block segmentation and rate matching for multiple transport block transmissions in accordance with various aspects of the present disclosure. The operations of method 1800 may be implemented by a base station 105 or its components as described with reference to FIGS. 1-17. For example, the operations of method 1800 may be performed by the base station wireless communications management module 1410 as described with reference to FIGS. 14-17. In some examples, a base station 105 may execute a set of codes to control the functional elements of the base station 105 to perform the functions described below. Additionally or alternatively, the base station 105 may perform aspects the functions described below using special-purpose hardware.

At block 1805, the base station 105 may identify a transport block group size for a transmission to a receiver as described with reference to FIGS. 2-9. In certain examples, the operations of block 1805 may be performed by the transport block group size module 1505 as described with reference to FIG. 15.

At block 1810, the base station 105 may determine a retransmission size of any code blocks of one or more prior transport blocks to be retransmitted to the receiver during the transmission as described with reference to FIGS. 2-9. In certain examples, the operations of block 1810 may be performed by the retransmission determination module 1510 as described with reference to FIG. 15.

At block 1815, the base station 105 may determine whether to transmit a new transport block to the receiver during the transmission based on the transport block group size and the retransmission size as described with reference to FIGS. 2-9. In certain examples, the operations of block 1815 may be performed by the new transport block determination module 1515 as described with reference to FIG. 15.

Figure 19:
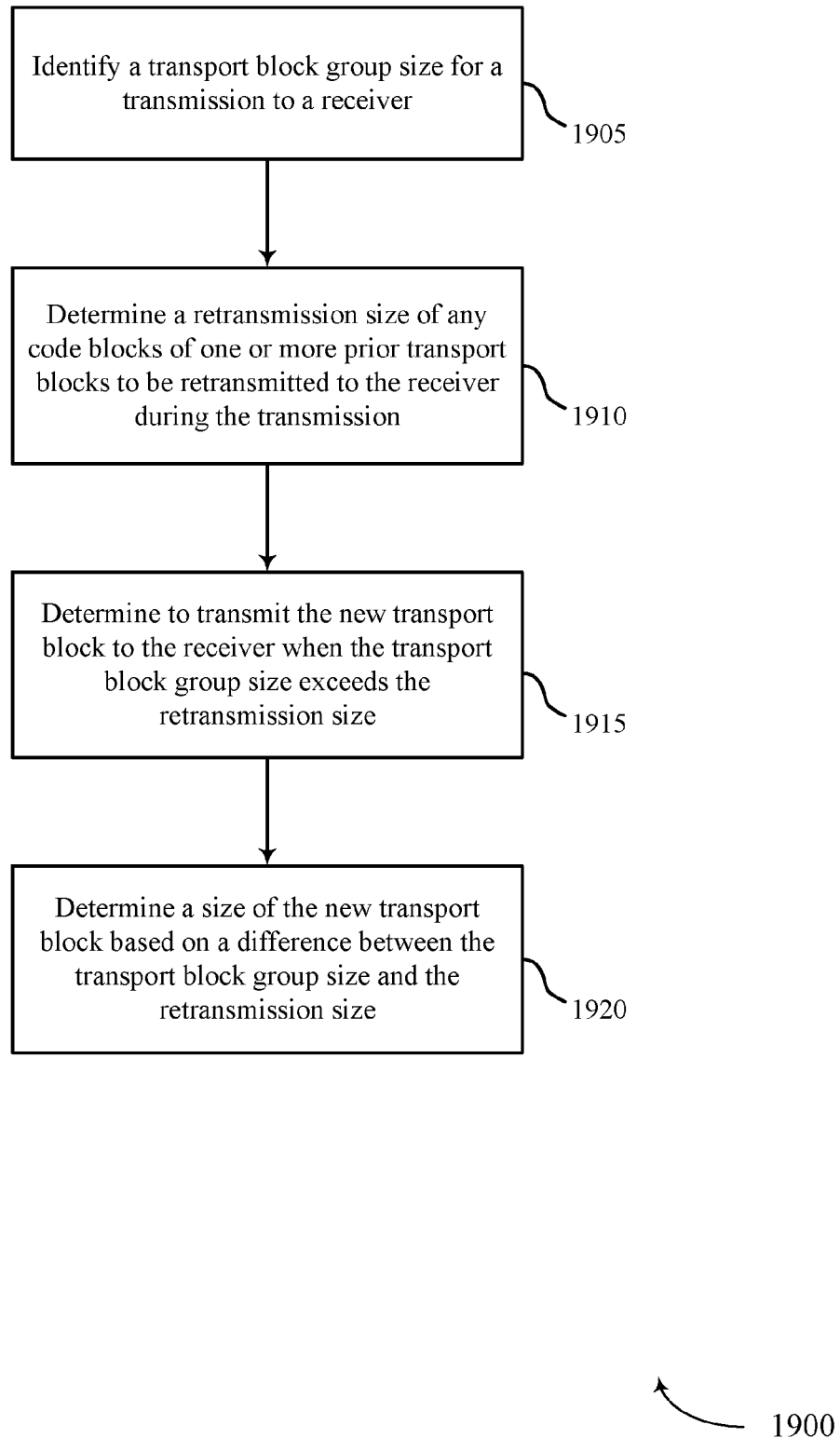

FIG. 19 shows a flowchart illustrating a method 1900 for code block segmentation and rate matching for multiple transport block transmissions in accordance with various aspects of the present disclosure. The operations of method 1900 may be implemented by a base station 105 or its components as described with reference to FIGS. 1-17. For example, the operations of method 1900 may be performed by the base station wireless communications management module 1410 as described with reference to FIGS. 14-17. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of method 1800 of FIG. 18.

At block 1905, the base station 105 may identify a transport block group size for a transmission to a receiver as described with reference to FIGS. 2-9. In certain examples, the operations of block 1905 may be performed by the transport block group size module 1505 as described with reference to FIG. 15.

At block 1910, the base station 105 may determine a retransmission size of any code blocks of one or more prior transport blocks to be retransmitted to the receiver during the transmission as described with reference to FIGS. 2-9. In certain examples, the operations of block 1910 may be performed by the retransmission determination module 1510 as described with reference to FIG. 15.

At block 1915, the base station 105 may determine to transmit the new transport block to the receiver when the transport block group size exceeds the retransmission size as described with reference to FIGS. 2-9. In certain examples, the operations of block 1915 may be performed by the new transport block determination module 1515 as described with reference to FIG. 15.

At block 1920, the base station 105 may determine a size of the new transport block based on a difference between the transport block group size and the retransmission size as described with reference to FIGS. 2-9. In certain examples, the operations of block 1920 may be performed by the new transport block determination module 1515 as described with reference to FIG. 15.

Figure 20:
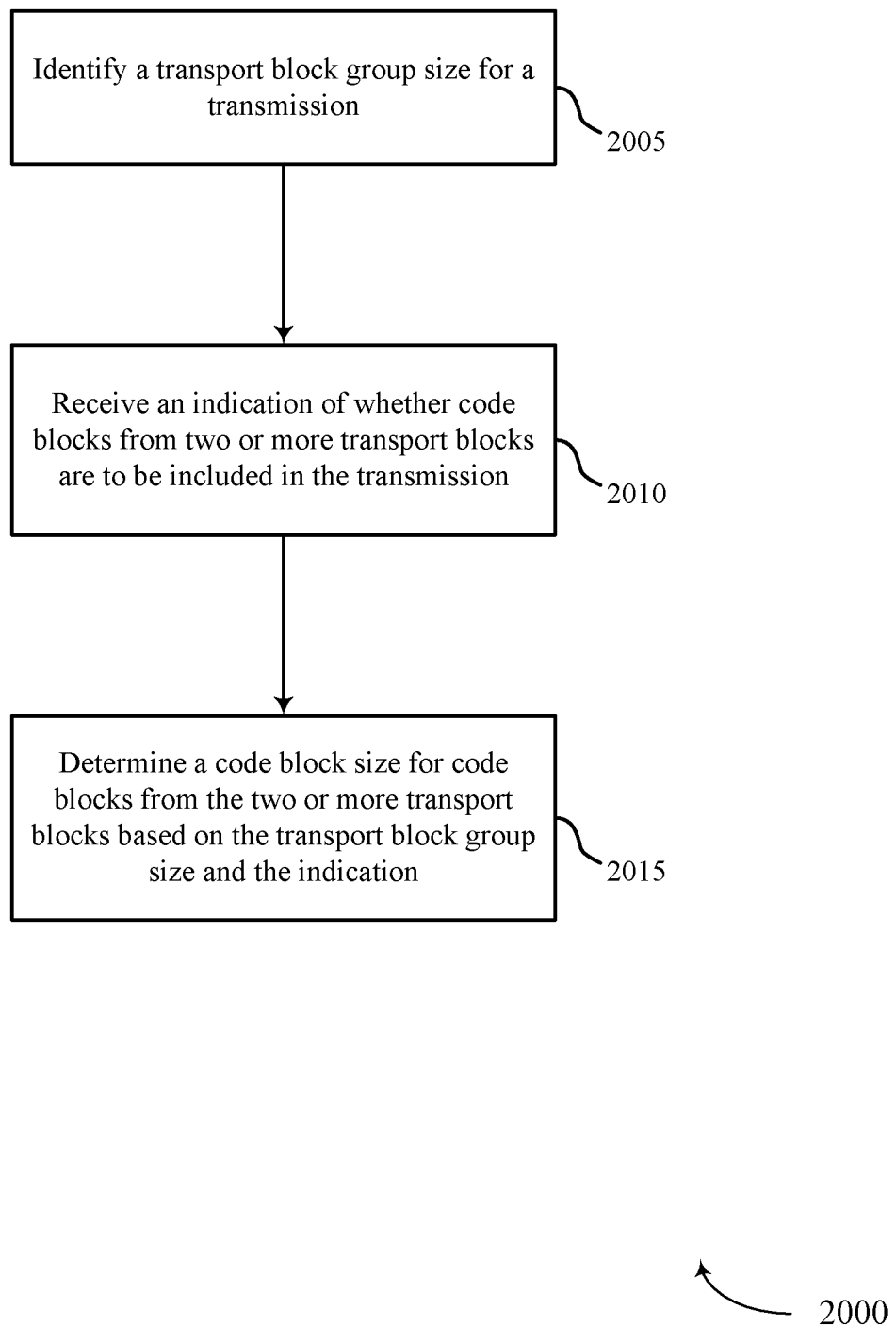

FIG. 20 shows a flowchart illustrating a method 2000 for code block segmentation and rate matching for multiple transport block transmissions in accordance with various aspects of the present disclosure. The operations of method 2000 may be implemented by a UE 115 or its components as described with reference to FIGS. 1-17. For example, the operations of method 2000 may be performed by the wireless communications management module 1010 as described with reference to FIGS. 10-13. In some examples, a UE 115 may execute a set of codes to control the functional elements of the UE 115 to perform the functions described below. Additionally or alternatively, the UE 115 may perform aspects the functions described below using special-purpose hardware.

At block 2005, the UE 115 may identify a transport block group size for a transmission as described with reference to FIGS. 2-9. In certain examples, the operations of block 2005 may be performed by the UE TBG size determination module 1105 as described with reference to FIG. 11.

At block 2010, the UE 115 may receive an indication of whether code blocks from two or more transport blocks are to be included in the transmission as described with reference to FIGS. 2-9. In certain examples, the operations of block 2010 may be performed by the UE retransmission determination module 1110 as described with reference to FIG. 11.

At block 2015, the UE 115 may determine a code block size for code blocks from the two or more transport blocks based on the transport block group size and the indication as described with reference to FIGS. 2-9. In certain examples, the operations of block 2015 may be performed by the UE CB segmentation module 1115 as described with reference to FIG. 11.

Figure 21:
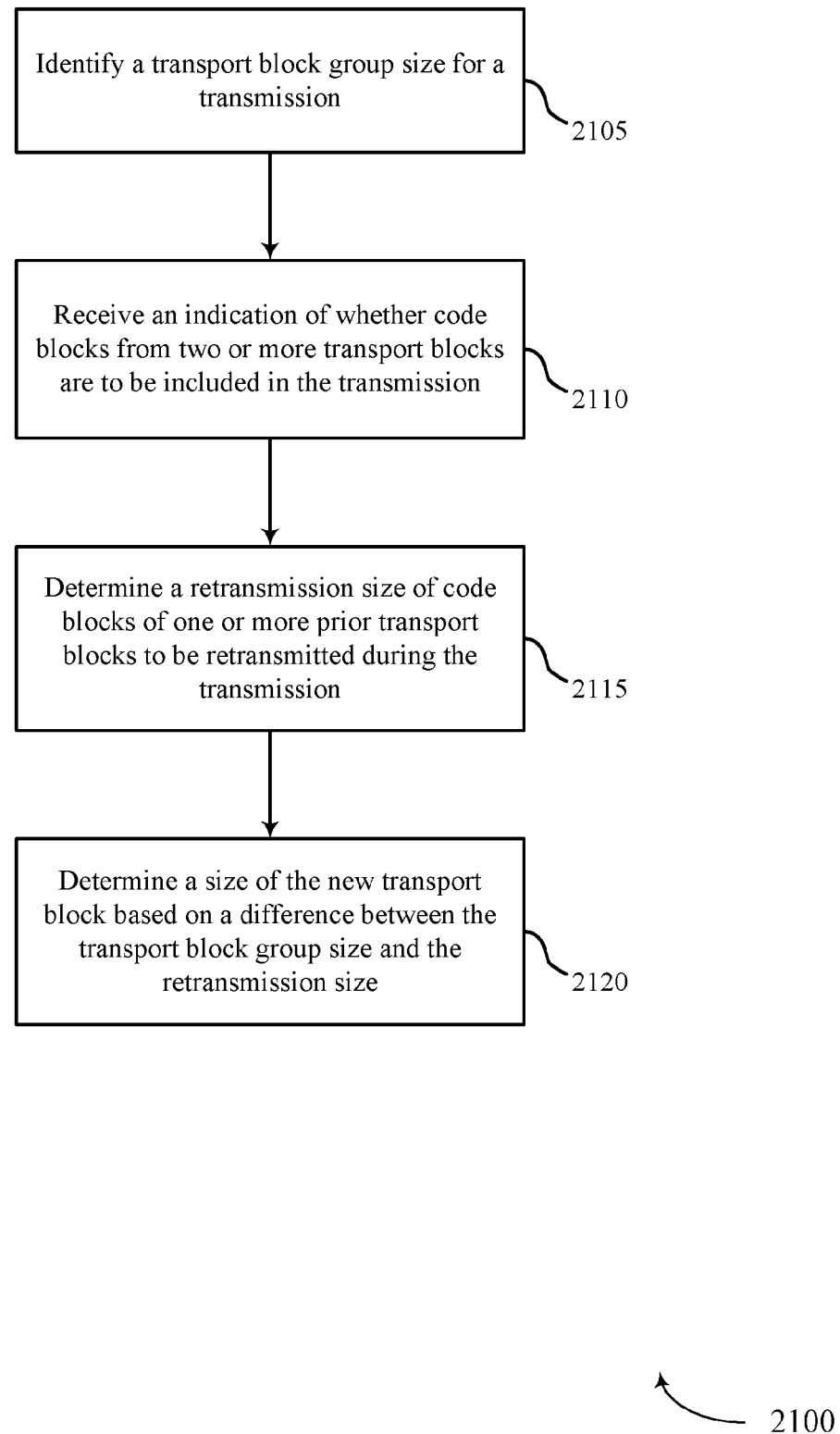

FIG. 21 shows a flowchart illustrating a method 2100 for code block segmentation and rate matching for multiple transport block transmissions in accordance with various aspects of the present disclosure. The operations of method 2100 may be implemented by a UE 115 or its components as described with reference to FIGS. 1-17. For example, the operations of method 2100 may be performed by the wireless communications management module 1010 as described with reference to FIGS. 10-13. In some examples, a UE 115 may execute a set of codes to control the functional elements of the UE 115 to perform the functions described below. Additionally or alternatively, the UE 115 may perform aspects the functions described below using special-purpose hardware. The method 2100 may also incorporate aspects of method 2000 of FIG. 20.

At block 2105, the UE 115 may identify a transport block group size for a transmission as described with reference to FIGS. 2-9. In certain examples, the operations of block 2105 may be performed by the UE TBG size determination module 1105 as described with reference to FIG. 11.

At block 2110, the UE 115 may receive an indication of whether code blocks from two or more transport blocks are to be included in the transmission as described with reference to FIGS. 2-9. In certain examples, the operations of block 2110 may be performed by the UE retransmission determination module 1110 as described with reference to FIG. 11.

At block 2115, the UE 115 may determine a retransmission size of code blocks of one or more prior transport blocks to be retransmitted during the transmission as described with reference to FIGS. 2-9. In certain examples, the operations of block 2115 may be performed by the UE CB segmentation module 1115 as described with reference to FIG. 11.

At block 2120, the UE 115 may determine a size of the new transport block based on a difference between the transport block group size and the retransmission size as described with reference to FIGS. 2-9. In certain examples, the operations of block 2120 may be performed by the UE CB segmentation module 1115 as described with reference to FIG. 11.

Figure 22:
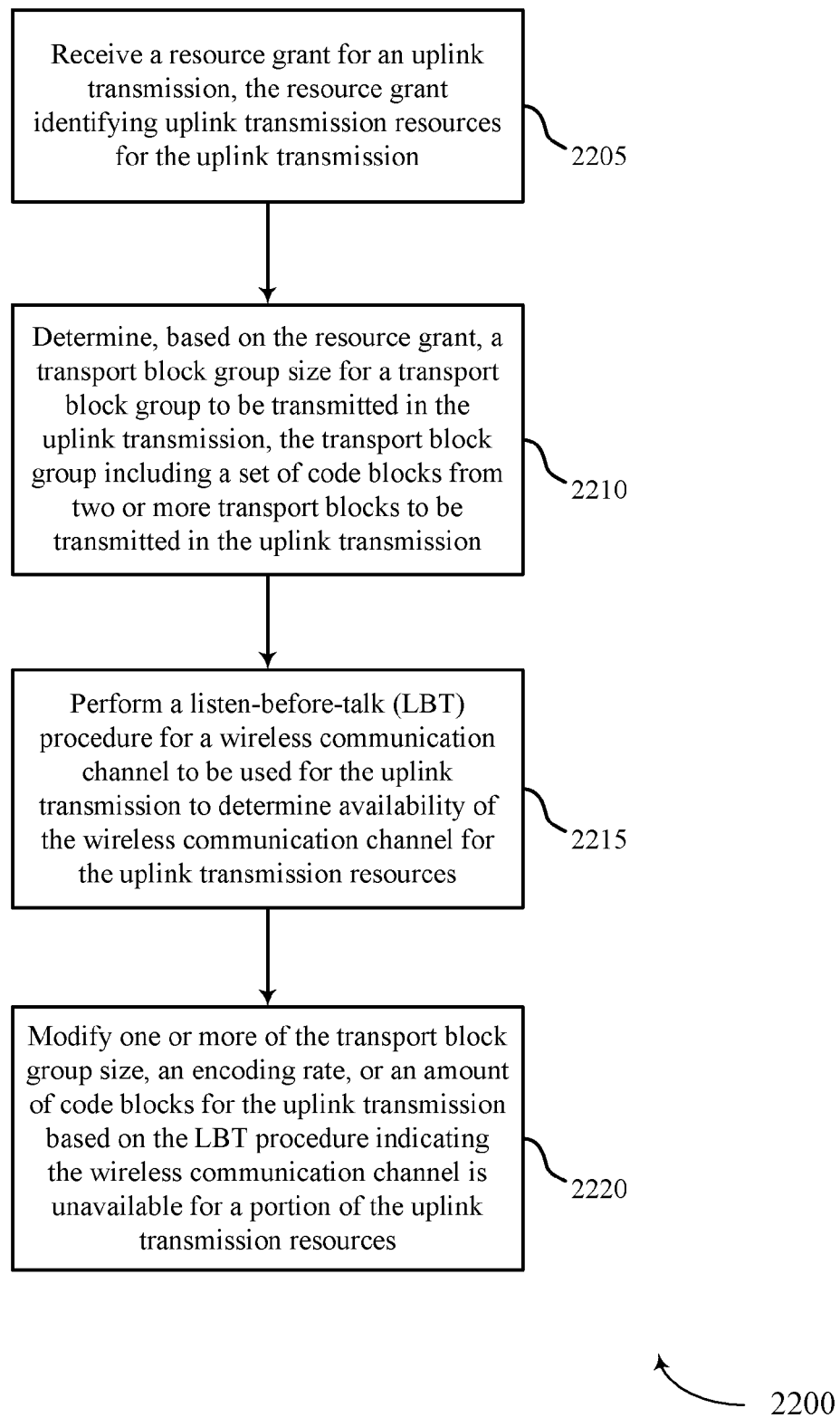

FIG. 22 shows a flowchart illustrating a method 2200 for code block segmentation and rate matching for multiple transport block transmissions in accordance with various aspects of the present disclosure. The operations of method 2200 may be implemented by a UE 115 or its components as described with reference to FIGS. 1-17. For example, the operations of method 2200 may be performed by the wireless communications management module 1010 as described with reference to FIGS. 10-13. In some examples, a UE 115 may execute a set of codes to control the functional elements of the UE 115 to perform the functions described below. Additionally or alternatively, the UE 115 may perform aspects the functions described below using special-purpose hardware. The method 2200 may also incorporate aspects of methods 2000, and 2100 of FIGS. 20-21.

At block 2205, the UE 115 may receive a resource grant for an uplink transmission, the resource grant identifying uplink transmission resources for the uplink transmission as described with reference to FIGS. 2-9. In certain examples, the operations of block 2205 may be performed by the UE resource grant module 1220 as described with reference to FIG. 12.

At block 2210, the UE 115 may determine, based on the resource grant, a transport block group size for a transport block group to be transmitted in the uplink transmission, the transport block group including a plurality of code blocks from two or more transport blocks to be transmitted in the uplink transmission as described with reference to FIGS. 2-9. In certain examples, the operations of block 2210 may be performed by the UE TBG size determination module 1105 as described with reference to FIG. 11.

At block 2215, the UE 115 may perform a listen-before-talk (LBT) procedure for a wireless communication channel to be used for the uplink transmission to determine availability of the wireless communication channel for the uplink transmission resources as described with reference to FIGS. 2-9. In certain examples, the operations of block 2215 may be performed by the UE LBT module 1225 as described with reference to FIG. 12.

At block 2220, the UE 115 may modify one or more of the transport block group size, an encoding rate, or an amount of code blocks for the uplink transmission based on the LBT procedure indicating the wireless communication channel is unavailable for a portion of the uplink transmission resources as described with reference to FIGS. 2-9. In certain examples, the operations of block 2220 may be performed by the uplink modification module 1230 as described with reference to FIG. 12.

Figure 23:
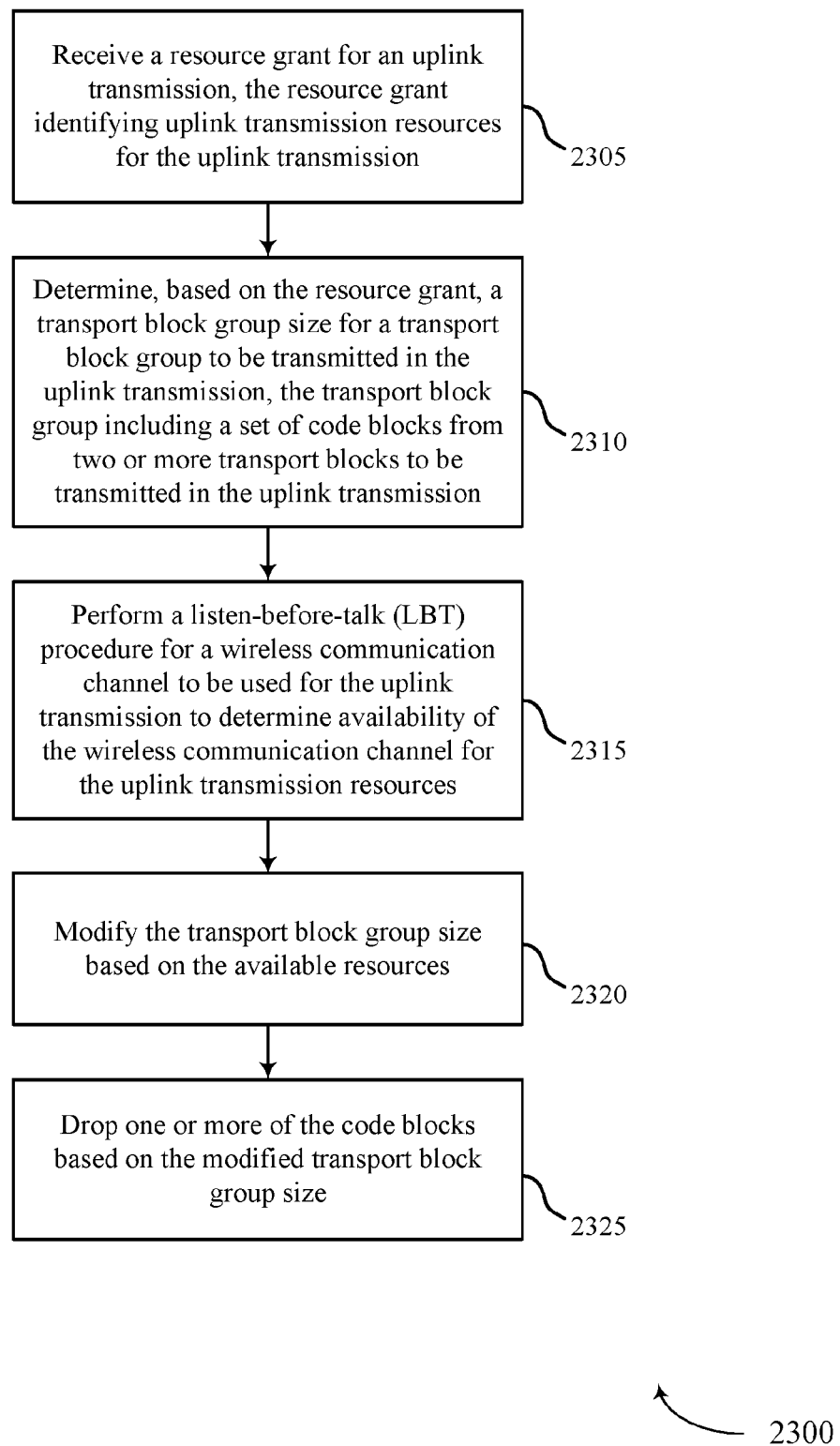

FIG. 23 shows a flowchart illustrating a method 2300 for code block segmentation and rate matching for multiple transport block transmissions in accordance with various aspects of the present disclosure. The operations of method 2300 may be implemented by a UE 115 or its components as described with reference to FIGS. 1-17. For example, the operations of method 2300 may be performed by the wireless communications management module 1010 as described with reference to FIGS. 10-13. In some examples, a UE 115 may execute a set of codes to control the functional elements of the UE 115 to perform the functions described below. Additionally or alternatively, the UE 115 may perform aspects the functions described below using special-purpose hardware. The method 2300 may also incorporate aspects of methods 2000, 2100, and 2200 of FIGS. 20-22.

At block 2305, the UE 115 may receive a resource grant for an uplink transmission, the resource grant identifying uplink transmission resources for the uplink transmission as described with reference to FIGS. 2-9. In certain examples, the operations of block 2305 may be performed by the UE resource grant module 1220 as described with reference to FIG. 12.

At block 2310, the UE 115 may determine, based on the resource grant, a transport block group size for a transport block group to be transmitted in the uplink transmission, the transport block group including a plurality of code blocks from two or more transport blocks to be transmitted in the uplink transmission as described with reference to FIGS. 2-9. In certain examples, the operations of block 2310 may be performed by the UE TBG size determination module 1105 as described with reference to FIG. 11.

At block 2315, the UE 115 may perform a listen-before-talk (LBT) procedure for a wireless communication channel to be used for the uplink transmission to determine availability of the wireless communication channel for the uplink transmission resources as described with reference to FIGS. 2-9. In certain examples, the operations of block 2315 may be performed by the UE LBT module 1225 as described with reference to FIG. 12.

At block 2320, the UE 115 may modify the transport block group size based on the available resources as described with reference to FIGS. 2-9. In certain examples, the operations of block 2320 may be performed by the uplink modification module 1230 as described with reference to FIG. 12.

At block 2325, the UE 115 may drop one or more of the code blocks based on the modified transport block group size as described with reference to FIGS. 2-9. In certain examples, the operations of block 2325 may be performed by the uplink modification module 1230 as described with reference to FIG. 12.

Thus, methods 1800, 1900, 2000, 2100, 2200, and 2300 may provide for code block segmentation and rate matching for multiple transport block transmissions. It should be noted that methods 1800, 1900, 2000, 2100, 2200, and 2300 describe possible implementation, and that the operations and the steps may be rearranged or otherwise modified such that other implementations are possible. In some examples, aspects from two or more of the methods 1800, 1900, 2000, 2100, 2200, and 2300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE—a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying a transport block group size of a transport block group for a transmission to a receiver;
   determining a retransmission size of one or more code blocks of one or more prior transport blocks to be retransmitted to the receiver during the transmission;
   determining a size of a new transport block based at least in part on a difference between the transport block group size and the retransmission size;
   determining whether to transmit the new transport block to the receiver during the transmission based at least in part on the size of the new transport block, the transport block group size and the retransmission size; and
   transmitting the transport block group to the receiver.

2. The method of claim 1, wherein code blocks from two or more different transport blocks are transmitted in the transport block group during the transmission.

3. The method of claim 1, further comprising:
   determining to transmit the new transport block to the receiver when the transport block group size exceeds the retransmission size.

4. The method of claim 1, wherein the transport block group size is determined based at least in part on one or more of a number of resource blocks in wireless resources assigned for the transmission, a number of transmission time intervals in the wireless resources assigned for the transmission, a number of spatial multiplexing layers used for the transmission, or a modulation and coding scheme used for the transmission.

5. The method of claim 1, wherein the determining the retransmission size comprises:

determining that one or more code blocks from the one or more prior transport blocks transmitted to the receiver are to be retransmitted to the receiver; and aggregating code block sizes of the one or more code blocks that are to be retransmitted.

6. The method of claim 5, wherein the determining that the one or more code blocks from the one or more prior transport blocks are to be retransmitted to the receiver comprises determining that a negative acknowledgment (NACK) is associated with the one or more code blocks.

7. The method of claim 1, further comprising:
transmitting an indication of whether the new transport block is to be transmitted during the transmission; and
identifying a number of consecutive prior transport blocks comprising code blocks retransmitted during the transmission; and
discarding code blocks to be retransmitted that are associated with transport blocks prior to the number of consecutive prior transport blocks comprising code blocks retransmitted during the transmission.

8. The method of claim 1, wherein the retransmission size is determined based at least in part on a sum of code block sizes of code blocks to be retransmitted.

9. The method of claim 1, further comprising:
transmitting an indication of the number of consecutive prior transport blocks comprising code blocks retransmitted during the transmission.

10. The method of claim 1, further comprising:
determining that a difference between the transport block group size and the retransmission size supports including only the code blocks of the one or more prior transport blocks to be retransmitted to the receiver in the transmission.

11. The method of claim 1, further comprising:
determining that a difference between the transport block group size and the retransmission size supports including the new transport block in the transmission.

12. The method of claim 1, wherein the transmission to the receiver is a spatially multiplexed transmission on two or more spatial multiplexing layers, and wherein a modulation and coding scheme (MCS) of each spatial multiplexing layer is determined independently of the MCS for other of the spatial multiplexing layers.

13. The method of claim 12, wherein
identifying the transport block group size comprises identifying the transport block group size for each spatial multiplexing layer, and
determining the retransmission size comprises determining the retransmission size of any code blocks of one or more prior transport blocks to be retransmitted to the receiver during the transmission for each spatial multiplexing layer.

14. A method for wireless communication, comprising:
identifying a transport block group size for a transmission;
receiving an indication of whether code blocks from two or more transport blocks are to be included in the transmission;
determining a retransmission size of code blocks of one or more prior transport blocks to be retransmitted during the transmission;
determining a size of a new transport block based at least in part on a difference between the transport block group size and the retransmission size; and
receiving the transmission in accordance with the transport block group size.

15. The method of claim 14, further comprising:
identifying a number of consecutive prior transport blocks comprising code blocks retransmitted during the transmission; and
discarding information related to code blocks that are associated with transport blocks prior to the number of consecutive prior transport blocks comprising code blocks retransmitted during the transmission.

16. The method of claim 14, further comprising:
receiving an indication that the new transport block is to be transmitted during the transmission.

17. The method of claim 16, wherein the indication comprises a one-bit indicator, and wherein the new transport block is transmitted on each of two or more spatial multiplexing layers that has a retransmission size that is less than the transport block group size.

18. A method for wireless communication, comprising:
receiving a resource grant for an uplink transmission, the resource grant identifying uplink transmission resources for the uplink transmission;
determining, based at least in part on the resource grant, a transport block group size for a transport block group to be transmitted in the uplink transmission, the transport block group including a plurality of code blocks from two or more transport blocks to be transmitted in the uplink transmission;
determining available resources for the uplink transmission;
modifying a coding rate for the uplink transmission based at least in part on the transport block group size and the available resources; and
transmitting the transport block group in the available resources using the modified coding rate.

19. The method of claim 18, further comprising:
performing a listen-before-talk (LBT) procedure for a wireless communication channel to be used for the uplink transmission to determine availability of the wireless communication channel for the uplink transmission resources.

20. The method of claim 19, further comprising:
modifying one or more of the transport block group size, an encoding rate, or an amount of code blocks for the uplink transmission based at least in part on the LBT procedure indicating the wireless communication channel is unavailable for a portion of the uplink transmission resources.

21. The method of claim 18, wherein the plurality of code blocks comprise at least a first code block from a first transport block and a second code block from a second transport block, and wherein code block sizes of the first code block and second code block are different.

22. The method of claim 19, wherein the uplink transmission resources comprise two or more transmission time intervals (TTIs) for the uplink transmission, wherein the LBT procedure is performed for a first TTI, and wherein the LBT procedure is performed for a second TTI when the LBT procedure for the first TTI is unsuccessful.

23. The method of claim 19, wherein the uplink transmission resources comprise two or more frequency resources for the uplink transmission, and wherein the LBT procedure is performed for the frequency resources.

24. The method of claim 18, further comprising:
determining available resources for the uplink transmission; and
identifying a portion of the plurality of code blocks to be transmitted in the available resources.

25. The method of claim 18, further comprising:
- determining available resources for the uplink transmission;
- modifying the transport block group size based at least in part on the available resources; and
- dropping one or more of the code blocks based at least in part on the modified transport block group size.

26. An apparatus for wireless communication, comprising:
- a processor;
- memory in electronic communication with the processor; and
- instructions stored in the memory and operable, when executed by the processor, to cause the apparatus to:
- identify a transport block group size of a transport block group for a transmission to a receiver;
- determine a retransmission size of one or more code blocks of one or more prior transport blocks to be retransmitted to the receiver during the transmission;
- determine a size of a new transport block based at least in part on a difference between the transport block group size and the retransmission size;
- determine whether to transmit the new transport block to the receiver during the transmission based at least in part on the size of the new transport block, the transport block group size and the retransmission size; and
- transmit the transport block group to the receiver.

* * * * *